US012724332B2

(12) United States Patent
Knecht et al.

(10) Patent No.: US 12,724,332 B2
(45) Date of Patent: Sep. 1, 2026

(54) ALIGNMENT OF A CLIP-ON MEDICAL DEVICE TO A SMART DEVICE CAMERA

(71) Applicant: Kenvue Brands LLC, Summit, NJ (US)

(72) Inventors: Max Hunter Knecht, Brooklyn, NY (US); Mark Adiletta, Jersey City, NJ (US); Orion Fields, Jamison, PA (US); Stephen Hayes, Bridgewater, NJ (US); Alexandra Gross, New York, NY (US); Asna Khan, Princeton, NJ (US); Maya Varadan, West Windsor, NJ (US); Eleanor F. Small, Philadelphia, PA (US); Sean James Coyle, Pennington, NJ (US)

(73) Assignee: Kenvue Brands LLC, Summit, NJ (US)

( * ) Notice: Subject to any disclaimer, the term of this patent is extended or adjusted under 35 U.S.C. 154(b) by 1067 days.

(21) Appl. No.: 17/587,052

(22) Filed: Jan. 28, 2022

(65) Prior Publication Data

US 2022/0233148 A1 Jul. 28, 2022

(51) Int. Cl.
*G03B 17/56* (2021.01)

(52) U.S. Cl.
CPC .................................. *G03B 17/566* (2013.01)

(58) Field of Classification Search
CPC ..... G03B 17/56; G03B 17/565; G03B 17/566
See application file for complete search history.

(56) References Cited

U.S. PATENT DOCUMENTS

| | | | | |
|---|---|---|---|---|
| 9,095,252 | B2 | 8/2015 | Popovic | |
| 2015/0065803 | A1 | 3/2015 | Douglas et al. | |
| 2016/0196048 | A1* | 7/2016 | Khoury ............. | H04N 21/4312 715/761 |
| 2016/0343108 | A1 | 11/2016 | Oo et al. | |

FOREIGN PATENT DOCUMENTS

| | | | |
|---|---|---|---|
| CN | 101452117 | A | 6/2009 |
| CN | 107976810 | A | 5/2018 |
| RU | 2012 134 327 | A | 2/2014 |
| WO | 2020/102442 | A1 | 5/2020 |
| WO | WO 2020-168428 | A1 | 8/2020 |

OTHER PUBLICATIONS

Title: The Shape of the Pill: Perceived Effects, Evoked Bodily Sensations and Emotions; Author: Blazhenkova et al.; Publication Date: Sep. 8, 2020. (Year: 2020).*

* cited by examiner

*Primary Examiner* — Stephanie E Bloss
*Assistant Examiner* — Fang-Chi Chang
(74) *Attorney, Agent, or Firm* — Condo Roccia Koptiw LLP

(57) ABSTRACT

A smart device may assist a user in aligning an otoscope of an otoscope clip device with a camera of the smart device. A model identification may be determined. The model identification may indicate a model associated with the smart device. An alignment image may be determined using the model identification. The alignment image may be displayed on the display of the smart device.

17 Claims, 10 Drawing Sheets

ALIGNMENT OF A CLIP-ON MEDICAL DEVICE TO A SMART DEVICE CAMERA

CROSS-REFERENCE TO RELATED APPLICATIONS

This application claims the benefit of U.S. Provisional Application No. 63/142,572, filed on Jan. 28, 2021, the contents of which are incorporated by reference in their entirety herein.

BACKGROUND

An otoscope may be used for diagnosing or identifying problems of the outer ear and/or middle ear, such as issues with a tympanic membrane, or an ear infection (e.g., acute otitis media). When joined with a camera, the otoscope may be used for remote diagnosis when images or videos may be recorded by the user. For example, the otoscope may be used for tele-otoscopy and may enable a user to record a video of an ear canal of a patient (e.g., an image of the tympanic membrane). And the video may be sent to a remote physician for diagnosis. But the user may not be able to align the camera with the otoscope such that a clear video may be taken.

SUMMARY

Disclosed herein are systems, methods, and apparatus, for attaching and/or aligning a removable optical element, such as an otoscope, to a smart device, such as a smart phone. A user may be provided with an ability to align a camera of the smart device with the otoscope in such a way that a picture or video (e.g., a clear picture or a clear video) may be taken.

A device for aligning a removable optical element, such as an otoscope, may be provided. The device may be a smart device, such as a smart phone or smart tablet. The device may comprise one or more of a processor, a camera, and a display. A model identification may be determined. The model identification may indicate a model that may be associated with the device. For example the model identification may indicate that the model of the device is an iPhone 13 max. An alignment image may be determined using the model identification. The alignment image may indicate where a portion of the removable optical element is to be placed to align the removable optical element with a camera of the device. The alignment image may be displayed on a display of the device.

A device for aligning a removable optical element, such as an otoscope, may be provided. The device may be a smart device, such as a smart phone or smart tablet. The device may comprise one or more of a processor, a camera, and a display. One or more device parameters associated with the device may be determined. A location on the display for displaying an alignment image may be determined using the one or more parameters. The location may be determined such that the removable optical element would be aligned with the camera when a portion of the removable optical element is placed within the alignment image. The alignment image may be displayed at the location on the display.

A device for aligning a removable optical element, such as an otoscope, may be provided. The device may be a smart device, such as a smart phone or smart tablet. The device may comprise one or more of a memory, a processor, a camera, and a display. A model identification may be determined that may indicate a model associated with the device. For example, the model identification may indicate that the device is an Apple iPhone 6. An alignment image may be determined using the model identification. The alignment image may indicate where an alignment tab of a removable optical element may be placed to align the removable optical element with the camera of the device. For example, the alignment image may allow the removable optical element to be aligned with the camera when an alignment tab that belongs to the removable optical element is placed on, near, or within the alignment image. The alignment image may be displayed on the display of the device.

A device for aligning a removeable optical element with a camera may be provided. The device may be a smart device, such as a smart phone or smart tablet. The device may comprise one or more of a memory, a processor, a camera, and a display. An alignment image may be determined. The alignment image may comprise an alignment feature that may be complementary to an alignment tab feature of an alignment tab that may belong to the removable optical element. A location on a display may be determined for displaying the alignment image such that the removable optical element may be aligned with the camera when the alignment tab of the removable optical element is placed on, near, or within the alignment image. The alignment image may be displayed at the location on the display.

A method may be provided for aligning a removable optical element. A model identification may be determined. The model identification may indicate a model that may be associated with the device. For example the model identification may indicate that the model of the devices is an iPhone 13 max. An alignment image may be determined using the model identification. The alignment image may indicate where a portion of the removable optical element is to be placed to align the removable optical element with a camera of the device. The alignment image may be displayed on a display of the device.

A method may be provided for aligning a removable optical element with a camera on a device, such as a smart device. An alignment tab of a removable optical element may be placed on a display of the device. An alignment tab feature of the alignment tab may be aligned with an alignment image feature of an alignment image displayed on the display. The removable optical element may be secured to the device.

DETAILED DESCRIPTION

Figure 1A:
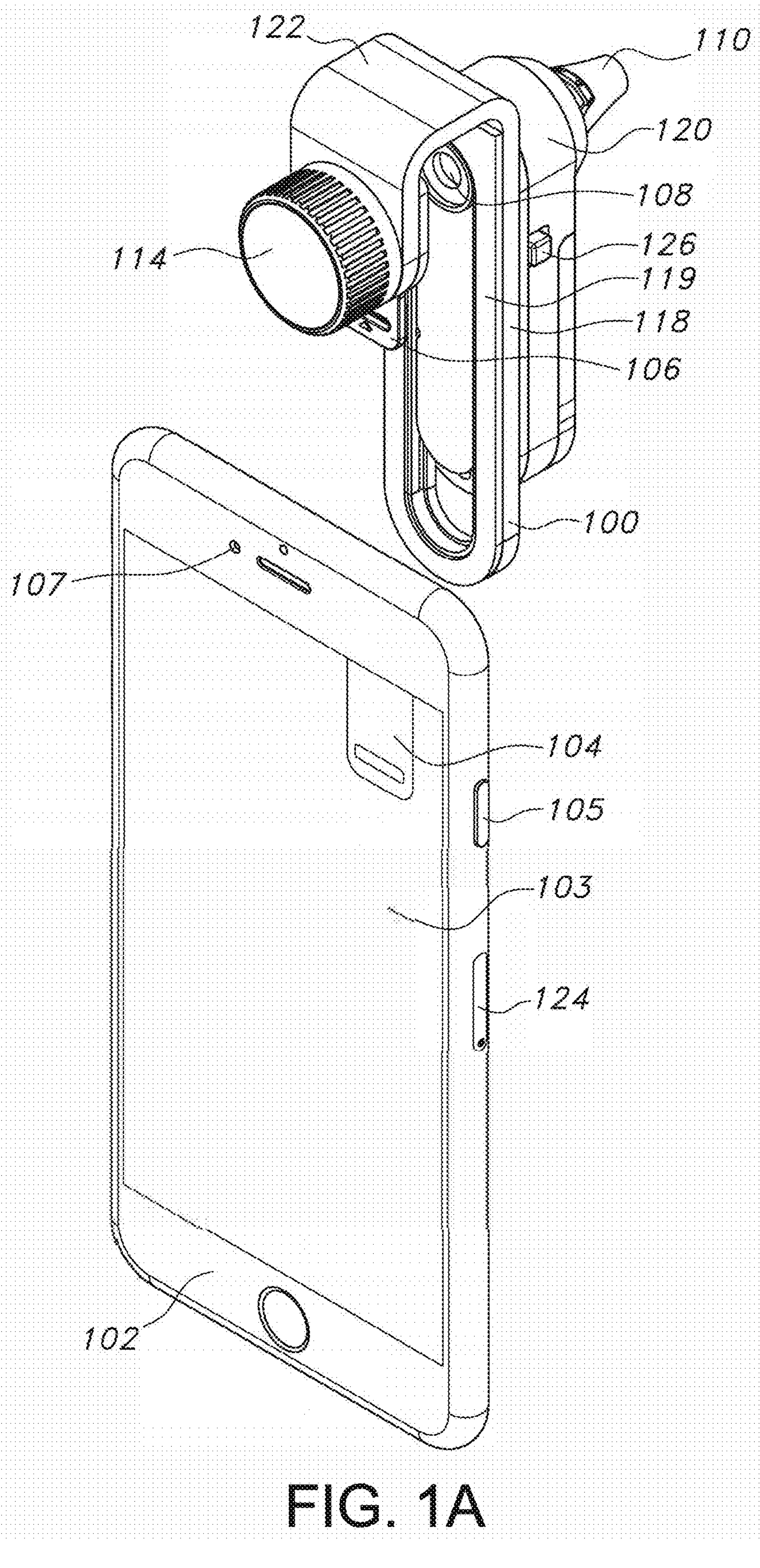
FIGS. 1A-B depict perspective views of an otoscope clip device that is detached from a smart device, such as a smart phone.

As remote medicine (e.g., tele-medicine) becomes more common, devices may allow individuals to perform tasks to assist doctors, nurses, or other medical practitioners. For example, a user may take a picture or a video within the ear canal a patient (e.g., an image of the tympanic membrane), so that a remote health care professional (e.g., a doctor) may diagnose an issue with the outer ear, the middle ear, and/or the ear canal of the patient. To assist in taking a picture or a video of the outer ear, the middle ear, and/or the ear canal, a user may use an otoscope. For example, a user may connect an otoscope to a camera, such a smart phone camera.

Disclosed herein are systems, methods, and apparatus, for attaching an otoscope to a smart device, such as a smart phone. A user may be provided with an ability to align a camera of the smart device with the otoscope in such a way that a picture or a video (e.g., a clear picture or a clear video) may be taken.

A device for aligning a removable optical element, such as an otoscope, may be provided. The device may be a smart device, such as a smart phone or smart tablet. The device may comprise one or more of a processor, a camera, and a display. A model identification may be determined. The model identification may indicate a model that may be associated with the device. For example the model identification may indicate that the model of the device is an iPhone 13 max. An alignment image may be determined using the model identification. The alignment image may indicate where a portion of the removable optical element is to be placed to align the removable optical element with a camera of the device. The alignment image may be displayed on a display of the device.

A device for aligning a removable optical element, such as an otoscope, may be provided. The device may be a smart device, such as a smart phone or smart tablet. The device may comprise one or more of a processor, a camera, and a display. One or more device parameters associated with the device may be determined. A location on the display for displaying an alignment image may be determined using the one or more parameters. The location may be determined such that the removable optical element would be aligned with the camera when a portion of the removable optical element is placed within the alignment image. The alignment image may be displayed at the location on the display.

A device for aligning a removable optical element, such as an otoscope, may be provided. The device may be a smart device, such as a smart phone or smart tablet. The device may comprise one or more of a memory, a processor, a camera, and a display. A model identification may be determined that may indicate a model associated with the device. For example, the model identification may indicate that the device is an Apple iPhone 6 (e.g., the model is an iPhone 6). An alignment image may be determined using the model identification. The alignment image may indicate where an alignment tab of a removable optical element may be placed to align the removable optical element with the camera of the device. For example, the alignment image may allow the removable optical element to be aligned with the camera when an alignment tab that belongs to the removable optical element is placed on, near, or within the alignment image. The alignment image may be displayed on the display of the device.

A device for aligning a removeable optical element with a camera may be provided. The device may be a smart device, such as a smart phone or smart tablet. The device may comprise one or more of a memory, a processor, a camera, and a display. An alignment image may be determined. The alignment image may comprise an alignment feature that may be complementary to an alignment tab feature of an alignment tab that may belong to the removable optical element. A location on a display may be determined for displaying the alignment image such that the removable optical element may be aligned with the camera when the alignment tab of the removable optical element is placed on, near, or within the alignment image. The alignment image may be displayed at the location on the display.

A method may be provided for aligning a removable optical element. A model identification may be determined. The model identification may indicate a model that may be associated with the device. For example the model identification may indicate that the model of the device is an iPhone 13 max. An alignment image may be determined using the model identification. The alignment image may indicate where a portion of the removable optical element is to be placed to align the removable optical element with a camera of the device. The alignment image may be displayed on a display of the device.

A method may be provided for aligning a removable optical element with a camera on a device, such as a smart device. An alignment tab of a removable optical element may be placed on a display of the device. An alignment tab feature of the alignment tab may be aligned with an alignment image feature of an alignment image displayed on the display. The removable optical element may be secured to the device.

A clip may be provided that may be attached to an otoscope to form an otoscope clip device. The otoscope clip may include a screw clamp assembly (e.g., a clamp), which may open and close using a screw mechanism. The screw clamp assembly may allow a user to align a viewing portion of the otoscope with a camera of a smart device. The screw clamp assembly may allow a user to tune (e.g., finely tune) the alignment of the otoscope clip such that the viewing portion of the otoscope may be aligned with the camera of the smart device.

The clip may include an alignment tab, which may be used to align the viewing portion of the otoscope with the camera of the smart device. For example, an alignment image may be presented on the smart device that may cause the viewing portion of the otoscope to be aligned with the camera of the smart device when the alignment tab is placed over and/or aligned with the alignment image. The alignment image may be an on-screen alignment image, and indicator, a marker, a combination thereof, and/or the like. The alignment image may be an outline of the alignment tab or other shape that may assist in the alignment of the viewing portion of the otoscope with the camera of the smart device.

A user may attach the otoscope clip to the smart device, may align a portion of the otoscope with the camera of the smart device using the alignment tab, and may secure the otoscope clip to the smart device using the screw clamp assembly to close the clamp. The user may then record a video and/or an image of the outer ear, the middle ear, and/or the ear canal of a patient and may provide that video to a physician for diagnosis. The recorded video may be analyzed by software on the smart device that may work in conjunction with the otoscope clip to provide image analysis, medical analysis, diagnosis, image taking guidance, and/or the like.

A device may be provided for attaching a movable optical element, such as an otoscope, to a smart phone. The device may comprise a main body. The main body may comprise an aperture and a first engagement member that may be configured to engage with a second engagement structure that belongs to a movable optical element. The movable optical element may be an otoscope. The device may comprise a first surface connected to the main body. The first surface may be configured to contact a first smart phone surface. The first smart phone surface may be a back side of the smart phone that may comprise a camera. The device may comprise a piston. The piston may comprise a shaft with a threaded hole and a keyway. The piston may comprise a second surface that may be parallel to the first surface and may be configured to contact a second smart phone surface. The second smart phone service may be a front side of the smart phone that may comprise a smart phone screen. The device may comprise a threaded knob that may be connected to the piston through the aperture. The threaded knob may comprise a reverse thread. The threaded knob may be configured to move the piston in a direction relative to the first surface when turned.

The first surface may be a first non-scratch surface. The second surface may be a second non-scratch surface. A non-scratch surface may be comprised of materials that prevent scratching or damaging another surface, such as a display screen. The materials may be rubber, plastic, fabric, a laminate, and/or the like. The first surface and/or the second surface may be or may comprise a gasket. The gasket may prevent slippage, may protect a phone surface, may act as a light block to prevent light from leaking from the otoscope clip device, may prevent light from entering the otoscope clip device optics, and/or may act as a light block to prevent light from entering a camera of the smart phone.

The main body of the device may comprise a number of apertures. For example, the main body may comprise a first aperture that may be a hub that may comprise a key that may be complementary to a keyway belonging to a shaft of the piston. The main body may comprise a second aperture that may be configured to be aligned with a viewing portion of the movable optical element.

The piston may further comprise a third surface with an outer edge for aligning a viewing portion of the removeable optical element with a camera lens of the smart phone. For example, the outer edge of the third surface may be designed such that its shape may assist a user in aligning the optical element with the camera lens of the smart phone.

A device may be provided for attaching a moveable optical element to a smart phone. The device may comprise a main body. The main body may comprise an aperture and a first engagement member. The first engagement member may be configured to engage with a second engagement member in a first position or a second position. The second engagement member may belong to a movable optical element. The device may comprise a first surface that may be connected to the main body and may be configured to contact a first smart phone surface. The first smart phone surface may be a back side of the smart phone where a camera of the smart phone may be located. The device may comprise a piston. The piston may comprise a shaft, a second surface, and a third surface. The second surface may be parallel to the first surface and may be configured to contact a second smart phone surface. The second smart phone surface may be a display of the smart phone. The third surface may comprise a protrusion for aligning a viewing portion of the moveable optical element with a camera lens of the smart phone in a first axis. The protrusion may be a protrusion that may by a detent and may correspond to an indentation to assist in securing an alignment.

The device may comprise a knob connected to the shaft through the aperture. The threaded knob may be connected to the piston through the aperture. The threaded knob may be configured to move the piston in a direction relative to the first surface when turned. For example, turning the threaded knob may cause the piston to move the first surface towards the second surface such that the first surface and the second surface may contact the smart phone. This may allow the device to clamp onto the smart phone.

The moveable optical element may be an otoscope. The main body comprises a top portion and a bottom portion. The first engagement member may be connected to the main body and may be configured to engage with the second engagement member in the first position or the second position. The second engagement member may belong to the movable optical element. The first position may be within the top portion and the second position may be within the bottom portion. For example, the movable optical element may be moved to the first position, which may be the top portion of the main body. As another example, the movable optical element may be moved to the second position, which may be the bottom portion of the main body. This may be done, for example, to allow a camera of the smart phone to be aligned with a viewing portion of the movable optical element.

The third surface of the piston may allow a user to align a viewing portion of the movable optical element with a camera of the smart phone. The third surface may comprise a number of physical features to assist in aligning the viewing portion of the movable optical element with the camera of the smart phone. The third surface may comprise an alignment aperture for aligning the viewing portion of the moveable optical element with the camera lens in a second axis. The third surface may comprise a color that may match an alignment image that to be displayed on the smart phone. The third surface may comprise an outer edge that complements an alignment image to be displayed on the smart phone.

A device may be provided for attaching an otoscope to a smart phone. The device may comprise a main body. The main body may comprise an aperture and an engagement member configured to engage with a moveable otoscope in a first position or a second position. The device may comprise a first surface that may be connected to the main body and may be configured to contact a first smart phone surface. The first smart phone surface may be a back side of the smart phone which may be where a camera of the smart phone may be located. The device may comprise a piston. The piston may comprise a shaft and a second surface. The second surface may be parallel to the first surface and may be configured to contact a second smart phone surface. The second smart phone surface may be a display of the smart phone. The device may comprise a threaded knob connected to the shaft through the aperture. The threaded ay be aligned with an outline of the alignment image. At least one of the first alignment tab feature and the second alignment tab feature may comprise at least one of a protrusion, a hole, an aperture, a color, a design, an icon, an etching, a symbol, a window, and/or a clear portion of the alignment tab.

The otoscope of the otoscope clip device may be moved into a first position or a second position within the otoscope clip device to assist with aligning the otoscope with a camera of the smart device. The otoscope of the otoscope clip device may be moved into a lower position within the otoscope clip device to assist with aligning the otoscope with a camera of the smart device. The otoscope of the otoscope clip device may be moved into an upper position within the otoscope clip device to assist with aligning the otoscope with a camera of the smart device.

A smart device may be used to provide a camera for an otoscope. The smart device may be a smart phone, a smart tablet (e.g., an iPad), a computer, and/or the like. The smart device may include a camera, which may be used by the otoscope to take an image and/or a video. The camera on the smart phone may provide a cost-effective method of providing the otoscope with the camera. For example, smart phones may now be widely available, and users may already have access to one. By providing a user with a device, such as an otoscope clip device, to attach an otoscope to the smart phone, the user may be given the ability to use the otoscope to take a video which may then be sent to a medical professional.

When attaching an otoscope to a smart phone with the otoscope clip, the user may wish to align the otoscope with the camera on the smart phone. Aligning the otoscope with the smart phone camera may provide an image that may not be impeded by a component of the otoscope. Aligning the otoscope with the smart phone camera may help keep stray light out of the image (e.g., seal light out of the otoscope) to improve an image quality. To align the otoscope with the camera on the smart phone, a user may have to flip the phone back and forth as the smart phone camera may be on the opposite side of the display.

To minimize flipping the phone back and forth during a camera alignment, an overlay or image may be projected and/or displayed onto the screen of the smart phone. The overlay may be referred to as an alignment image. The alignment image may be complementary to an alignment feature, such as an alignment tab, on the otoscope clip such that a user may align the alignment image with the alignment tab. The alignment image may be complementary to at least a portion of the otoscope clip (e.g., at least a portion of an alignment feature, an alignment tab, and/or the like) such that a user may align the alignment image with the alignment tab. When the alignment image is aligned with the alignment tab, the viewing portion of the otoscope may be aligned with the smart phone camera. Aligning the alignment image with the alignment tab may also allow the user to align the otoscope with the smart phone camera while minimizing turning the phone back and forth during the alignment.

The alignment image may encourage the user to correctly attach the otoscope to the smart phone using the otoscope clip device. For example, the alignment image may be placed at the top of the smart phone to encourage the user to attach the otoscope. For example, the alignment image may be placed at a position on the smart phone to encourage the user to place the otoscope clip over the top of the smart phone. For example, the alignment image may be displayed in such a way to encourage the user to attach the otoscope clip so that the otoscope clip may not impede one or more buttons of the smart phone when the otoscope clip is attached to the smart phone.

The otoscope clip device may be designed to provide better ergonomics for a user. For example, the otoscope clip device may be designed to improve how a user may be holding a smart device. The otoscope clip may be designed to avoid impeding the ability of the user to place the otoscope in an ear of a patient. The otoscope clip may be designed to encourage a user to correctly place the otoscope in an ear of the patient. For example, the clip may be designed to allow a user to rest their hand against a head of a patient while using the otoscope attached to the smart phone via the otoscope clip.

The otoscope clip may be designed to provide a secure method of attachment to the smart device and may be designed to be attached to a number of different styles of smart phones. The otoscope clip may comprise a clamp assembly that may be used to secure the otoscope clip to the smart phone. The clamp assembly may assist in minimizing the movement of the otoscope during the process of taking an image. For example, the clamp assembly may minimize movement of the clip along an axis of a surface of the smart phone to improve the ability of a user to align the viewing portion of the otoscope with the camera of the smart phone.

The otoscope clip may be designed to avoid compressing one or more buttons of the smart phone. The otoscope clip may be designed to prevent a user from accidentally pressing one or more buttons of the smart phone. For example, the clip may avoid compressing the on/off switch, may avoid compressing a volume switch, may prevent a user from pressing the on/off switch, may prevent a user from pressing a volume switch, and/or the like.

Figure 1B:
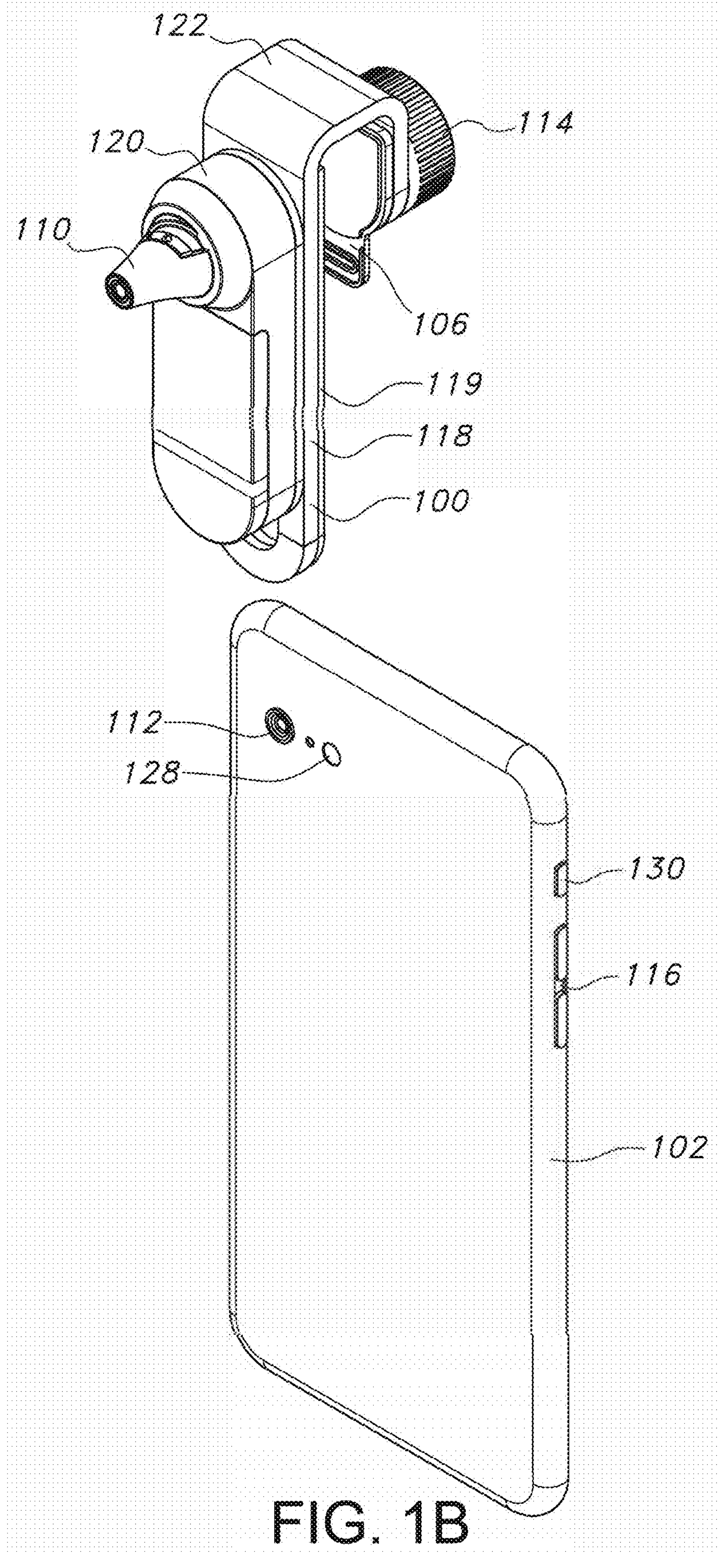

FIGS. 1A-B depict perspective views of an otoscope clip device that is detached from a smart device, such as a smart phone. As shown in FIG. 1A, otoscope clip device 100 may be detached from smart device 102. FIG. 1A may depict the front side of smart device 102, and a back side of the otoscope clip device 100. The back side of the otoscope clip device 100 may comprise a knob, such as knob 114, and an alignment tab, such as alignment tab 106. The front side of the smart device may comprise a camera, such as the camera 107, which may be directed towards a user, and a display screen, such as display 103. Front side of the smart device may comprise a button, such as a home button, and a speaker, which may be used by a user to listen to a phone call. Button 105 may be located on a side of smart device 102.

Smart device 102 may be a smart phone, a smart tablet (e.g., an iPad), a computer, and/or the like. The smart device may comprise a display, such as display 103. The display 103 may be a liquid crystal display (LCD) and may be located on the front facing portion of the smart device. The display 103 may show an alignment image 104. The alignment image 104 may assist the user in aligning a viewing portion of an otoscope with a camera of the smart device, such as the camera at 112 showing with respect to FIG. 1B Referring again to FIG. 1A, the alignment image 104 may be complementary to an alignment feature, such as the alignment tab 106, on the otoscope clip device 100 such that a user may align the alignment image 104 with the alignment tab 106. When the alignment image 104 is aligned with the alignment tab 106, the viewing portion 108 of the otoscope may be aligned with the smart device camera 112. Aligning the alignment image 104 with the alignment tab 106 may allow the user to align the viewing portion 108 of the otoscope with the smart device camera 112 while minimizing turning the phone back and forth during the alignment.

The otoscope clip device 100 may comprise a number of components. For example, the otoscope clip device 100 may comprise the clip assembly 122 and/or the otoscope assembly 120.

The otoscope clip device 100 may comprise alignment tab 106. The alignment tab may be a part of the clip assembly 122. The alignment tab 106 may include one or more features to assist in the alignment of the viewing portion 108 of the otoscope. The one or more features may include a protrusion, a hole, an aperture, a color, a design, an icon, an etching (e.g., a laser etching), a symbol, and/or the like.

The alignment tab 106 may include one or more alignment protrusions. An alignment protrusion of the one or more alignment protrusions may be a protrusion on a surface of the alignment tab 106 that may be aligned with a portion of alignment image 104. For example, alignment tab 106 may include an arrow shaped alignment protrusion that may be aligned with a line within a portion of the alignment image 104.

The alignment tab 106 may include an alignment design. The alignment design may be an etching on a surface of the alignment tab 106 to assist in the alignment of the viewing portion 108 of the otoscope. For example, the alignment design may be one or more intersecting lines, such as a crosshair, that when aligned with an alignment image on a smart device may align the viewing portion 108 of the otoscope with a camera of the smart device.

The alignment tab 106 may include an outer edge that may be aligned with an outer edge of the alignment image 104. The outer edge of the alignment tab 106 may be a shape that may be complementary to the outer edge of the alignment image 104. The outer edge of the alignment tab 106 may be a shape that may be complementary to at least a portion of the outer edge of the alignment image 104. When the outer edge of the alignment tab 106 is aligned with the outer edge of the alignment image 104, the viewing portion 108 of the otoscope may be aligned with the camera of the smart device.

Alignment tab 106 may include an aperture that may be aligned with an object within alignment image 104. For example, the aperture of alignment tab 106 may align with a bullseye target on alignment image 104, an oval shape within alignment image 104, a line within alignment image 104, a combination thereof, and/or the like. The alignment aperture may assist in the alignment of the viewing portion 108 of the otoscope. For example, the alignment aperture may cause the viewing portion 108 of the otoscope to be aligned with a camera of the smart device when the alignment aperture is aligned with a corresponding shape within an image on a display of the smart device.

The alignment tab 106 may be made of a material of a color that may match a color of alignment image 104. The alignment tab 106 may be made of a material of a color that may be complementary to a color of alignment image 104. The alignment tab 106 may be made of a clear material such that a user may see through the clear material and align the alignment tab 106 with the alignment image 104. The alignment tab 106 may be made of a material, such as a resilient material, that may be able to apply a pressure to a surface of the smart phone. For example, alignment tab 106 may be made of plastic, metal, a polymer, and/or the like.

Alignment tab 106 may be placed in a parallel position to another surface of otoscope clip device 100, such as a surface of clip engagement member 118. Alignment tab 106 may be placed in a parallel position to another surface of the otoscope clip device 100 such that the otoscope clip device 100 may form a c-shape. The c-shape that may be formed using the parallel position of alignment tab 106 with another surface of the otoscope clip device 100, such as a surface of clip engagement member 118, and may be used to provide a clamp, such as a c-clamp. The clamp may be driven by a knob, such as the knob 114.

The otoscope clip device 100 may comprise knob 114, which may be a knob that may drive a screw clamp assembly. Knob 114 may be a part of the clip assembly 122. Knob 114 may be a cylindrical shape with a flat top surface, a bottom surface with at least a hole, and an outer surface. The outer surface of knob 114 may include a number of splines, knurling, or other texture which may provide a gripping surface. When turned, knob 114 may engage a screw clamp assembly such that a piston that may include alignment tab 106 may be moved towards a surface that is parallel to alignment tab 106. For example, a user may turn knob 114 so that alignment tab 106 moves towards a parallel surface of otoscope clip device 100. Knob 114 may cause the alignment tab 106 to move towards clip engagement member 118 such that alignment tab 106 and the clip engagement member 118 may clamp onto the smart device 102.

The otoscope clip device 100 may comprise clip engagement member 118. The clip engagement member 118 may be part of the clip assembly 122. The clip engagement member 118 may have a first surface and a second surface. The first surface of the clip engagement member 118 may face the back side of smart device 102. The first surface of the clip engagement member 118 may include an anti-skid material, and/or an anti-scratch material. For example, the first surface of the clip engagement member 118 may be made of rubber to prevent scratching and/or damage to smart device 102, and to prevent otoscope clip device 100 from moving when it is attached to the smart device 102. The clip engagement member 118 may include an elongated aperture. The elongated aperture may allow viewing portion 108 to protrude into or through the clip engagement member 118. This may allow viewing portion 108 to be moved into a number of positions such that viewing portion 108 may be aligned with smart device camera 112.

The clip engagement member 118 may include a number of features to allow the viewing portion 108 to be placed in one or more positions. For example, the clip engagement member 118 may include a protrusion in a side of clip engagement member 118 that may have a complimentary notch in the otoscope assembly 120, which may allow the otoscope assembly 120 and/or the viewing portion of the otoscope to be locked in a position.

The clip engagement member 118 may allow the otoscope assembly 120 to be attached and/or connected to clip assembly 122. The clip engagement member 118 may be a portion of a C-clamp that is part of clip assembly 112. The clip engagement member 118 may allow the otoscope assembly 120 to be movably attached to clip assembly 122. For example, clip engagement member 118 may allow otoscope assembly 120 to move into one or more positions within clip assembly 122. The clip engagement member 118 may allow the otoscope assembly 120 to be removably attachable to clip assembly 122. For example, clip engagement member 118 may allow otoscope assembly 120 to be attached to and/or removed from clip assembly 122.

The contact surface 119 may be in contact with the clip engagement member 118. The contact surface 119 may comprise an anti-skid material that may prevent slippage. The contact surface 119 may be or may comprise a gasket. The gasket may prevent slippage, may protect a phone surface, and/or may acts as a light block to prevent light leakage from the device. For example, the gasket may prevent ambient light from entering the optics.

The otoscope clip device 100 may comprise a viewing portion of an otoscope, such as the viewing portion 108. The viewing portion of the otoscope may be a part of the otoscope assembly 120. Viewing portion 108 may be where an image may come into focus from usage of the otoscope such that the image may be viewed at viewing portion 108. The viewing portion 108 of the otoscope may be where a user or a camera may look into the otoscope. For example, the viewing portion 108 may be used to view into an ear of a patient, may be used to take a picture or a video of an outer ear, a middle ear, and/or an ear canal of the patient, and/or the like. As described herein, viewing portion of 108 may come in contact with a camera or may be aligned with a camera.

The otoscope clip device 100 may comprise an otoscope assembly 120. The otoscope assembly 120 may comprise an otoscope. The otoscope assembly 120 may comprise the outer tip housing 110. The otoscope assembly 120 may comprise the light switch 126. The light switch 126 may control a light that may be within or near outer tip housing 110. For example, the light switch may turn on or off a light, which may be battery powered, that may be seen through an opening in the distal end of the outer tip housing 110. This may be done, for example, to provide light within an outer ear, a middle ear, and/or an ear canal of a patient such that a photo may be taken.

The otoscope clip device 100 may comprise the outer tip housing 110. The outer tip housing 110 may have a distal end with an opening that may peer into an outer ear, middle ear, and/or an ear canal of a patient when a speculum is attached to the outer clip 110. The outer tip housing 110 may have a proximal end that may be connected to the otoscope assembly 120. The outer tip housing 110 may include a radial slot that may allow a removable speculum to be attached to the outer tip housing 110. For example, the removable speculum may be attached to the outer tip housing 110 via the radial slot such that the otoscope assembly 120 may be used to take a picture or a video of an outer ear, middle ear, and/or ear canal a patient. The otoscope portion of the otoscope clip device 100 may provide an optic magnification of the outer ear, middle ear, and/or ear canal of the patient.

As shown in FIG. 1B, otoscope clip device 100 may be detached from smart device 102. FIG. 1B may be the back side of the smart device, and a front side of the otoscope clip device 100. The back side of the smart device 102 may include the light 128, and a smart phone camera, such as the smart device camera 112. The smart device camera 112 may face away from a user when the user is viewing the display screen, such as the display 103 of the smart device 102.

As described here in the otoscope clip device 100 may include the outer tip housing 110. The outer tip housing 110 may include an opening. A removable speculum may attach to and/or cover the outer tip housing 110. When the alignment tab 106 is aligned with the alignment image 104, the outer tip housing 110 may be situated in such a way as to be aligned with smart device camera 112. For example, an opening of the outer tip housing 110 may be aligned with the smart device camera 112, and the viewing portion 108 of the otoscope may be aligned with the smart device camera 112.

Figure 1C:
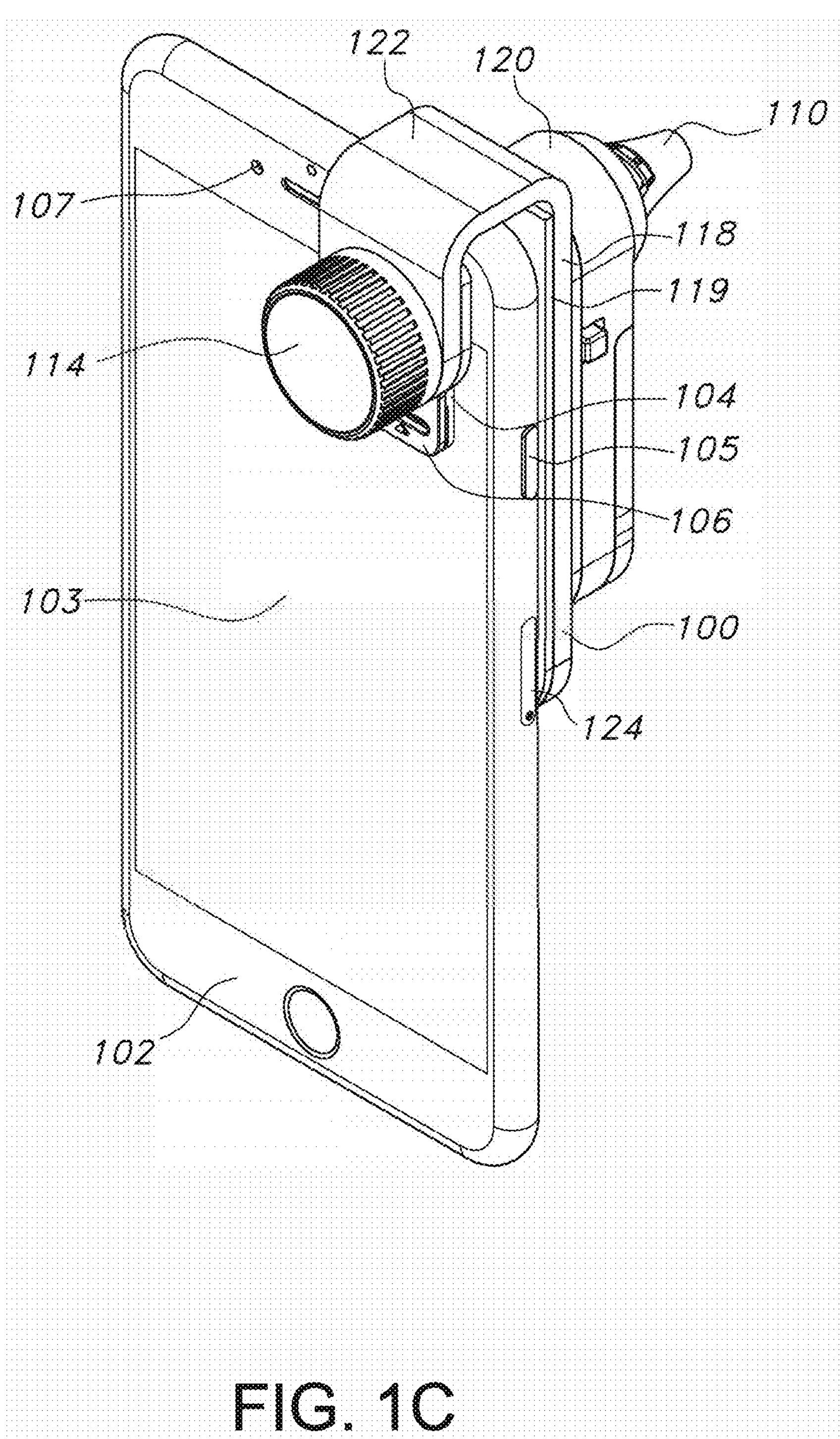
FIGS. 1C-D depict perspective views of an otoscope clip device that is attached to a smart device, such as a smart phone.
Figure 1D:
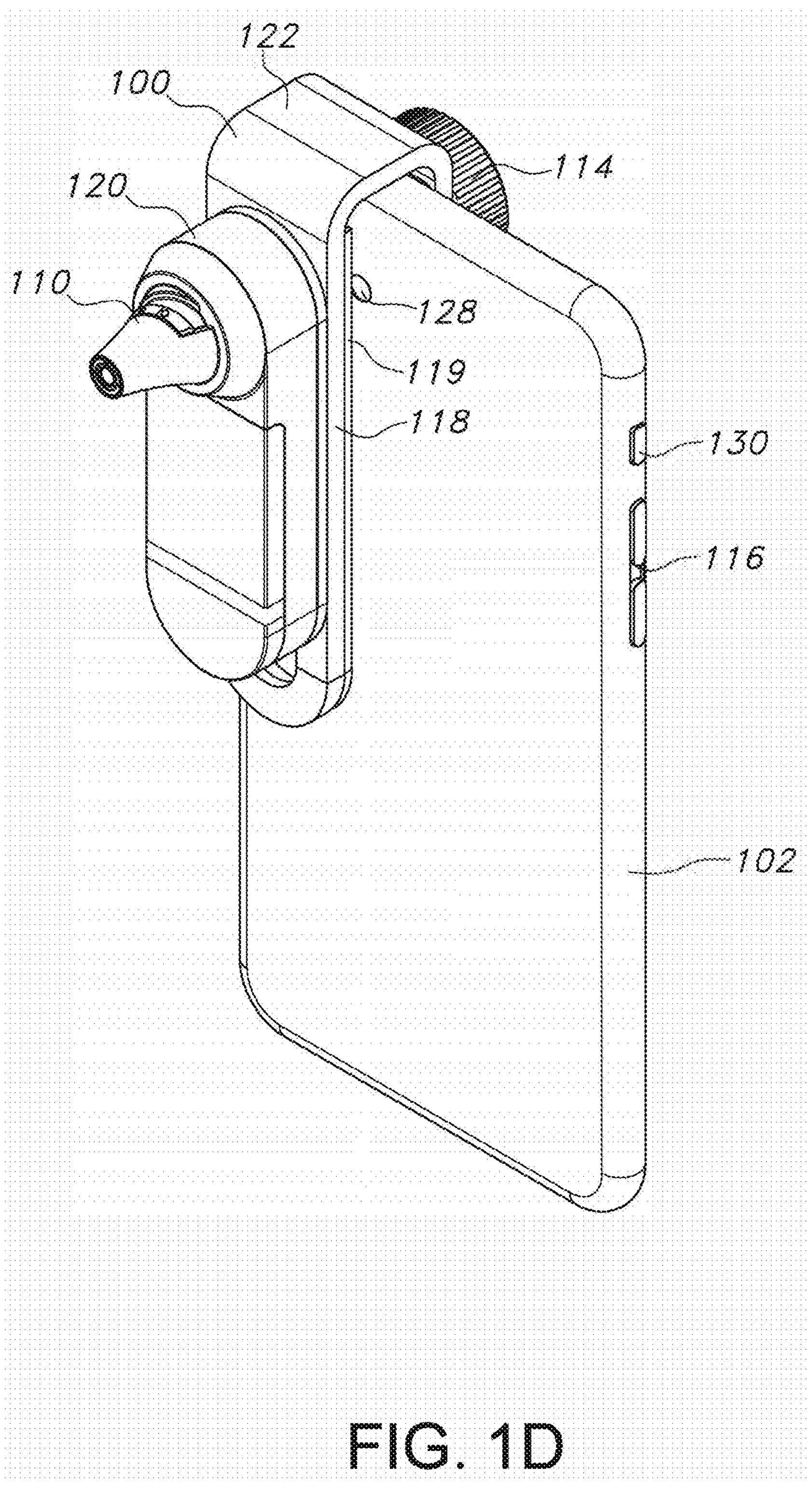

FIGS. 1C-D depict perspective views of an otoscope clip device that is attached to a smart device, such as a smart phone. As shown in FIG. 1C, otoscope clip device 100 may be attached to smart device 102. FIG. 1C may depict the front side of a smart device 102, and the back side of the otoscope clip device 100. The back side of otoscope clip device 100 may comprise a knob, such as 114, an alignment tab, such as alignment at 106. The front side of the smart device may comprise a camera, such as the camera 107, which may be directed towards the user, and a display screen, such as display 103.

The otoscope clip device 100 may be attached to smart device 102 by clamping mechanism, such as a screw clamp assembly, that may be driven by knob 114. The knob 114 may cause the screw clamp assembly to close when turned. For example, the knob 114 may cause the screw clamp assembly to close when turned in a clockwise direction. The knob 114 may cause the screw clamp assembly to open when turned. For example, the knob 114 may cause the screw clamp assembly to open when turned in a counterclockwise direction. When the screw clamp assembly is closed, the otoscope clip device 100 may be attached to the smart device 102. When the screw clamp assembly is open, the otoscope clip device 100 may be detached from the smart device 102.

When turned, knob 114 may engage a screw clamp assembly such that the screw clamp assembly may close. The knob 114 may cause a piston that may include alignment tab 106 to moved towards a surface that is parallel to alignment tab 106. For example, knob 114 may cause the alignment tab 106 to move towards clip engagement member 118 such that the alignment tab 106 may come in contact with a display of smart device 102 and clip engagement member 118 may come in contact with the back side of smart device 102. The alignment tab 106 and/or the engagement member may include a surface that may come in contact with the display 103. The surface of the alignment tab 106 may be made of a material that may be an anti-scratch and/or anti-skid.

Otoscope clip device 100 may be attached to smart device 102 in such a way as to avoid compressing and/or contacting one or more buttons of smart device 102. Otoscope clip device 100 may attach to smart device 102, such that otoscope clip device 100 may contact one or more of a front face, a back face, and a top portion of smart device 102. Otoscope clip device 100, may be attached in such a way as to avoid contacting the sim card cover 124, the button 105, the volume button 116, the switch 130 (the volume button 116 and the switch 130 may be shown with respect to FIG. 1D) of the smart device 102.

As shown in FIG. 1C, alignment tab 106 may be aligned with alignment image 104. For example, alignment tab 106 may cover alignment image 104. Alignment tab 106 may cover alignment image 104 such that alignment tab 106 may remain within the edges of alignment image 104.

When alignment tab 106 may be within and/or aligned with alignment image 104, the otoscope assembly 120 of otoscope clip device 100 may be aligned with smart device camera 112.

As shown in FIG. 1D, the otoscope assembly 120, the viewing portion 108 of the otoscope, and/or the outer tip housing 110 may be aligned with the smart device camera 112. The otoscope assembly 120 may be aligned with the smart device camera 112 in such a way that a user may place the otoscope with speculum in an ear of a patient and may take a photo of the outer ear, middle ear, and/or ear canal of the patient. For example, the smart device camera 112 may be able to use the otoscope assembly 120 to view an outer ear, middle ear, and/or ear canal of a patient via a sight path that may be established through the viewing portion 108 of the otoscope and through an opening in the outer tip housing 110 and through the attached speculum.

Figure 2:
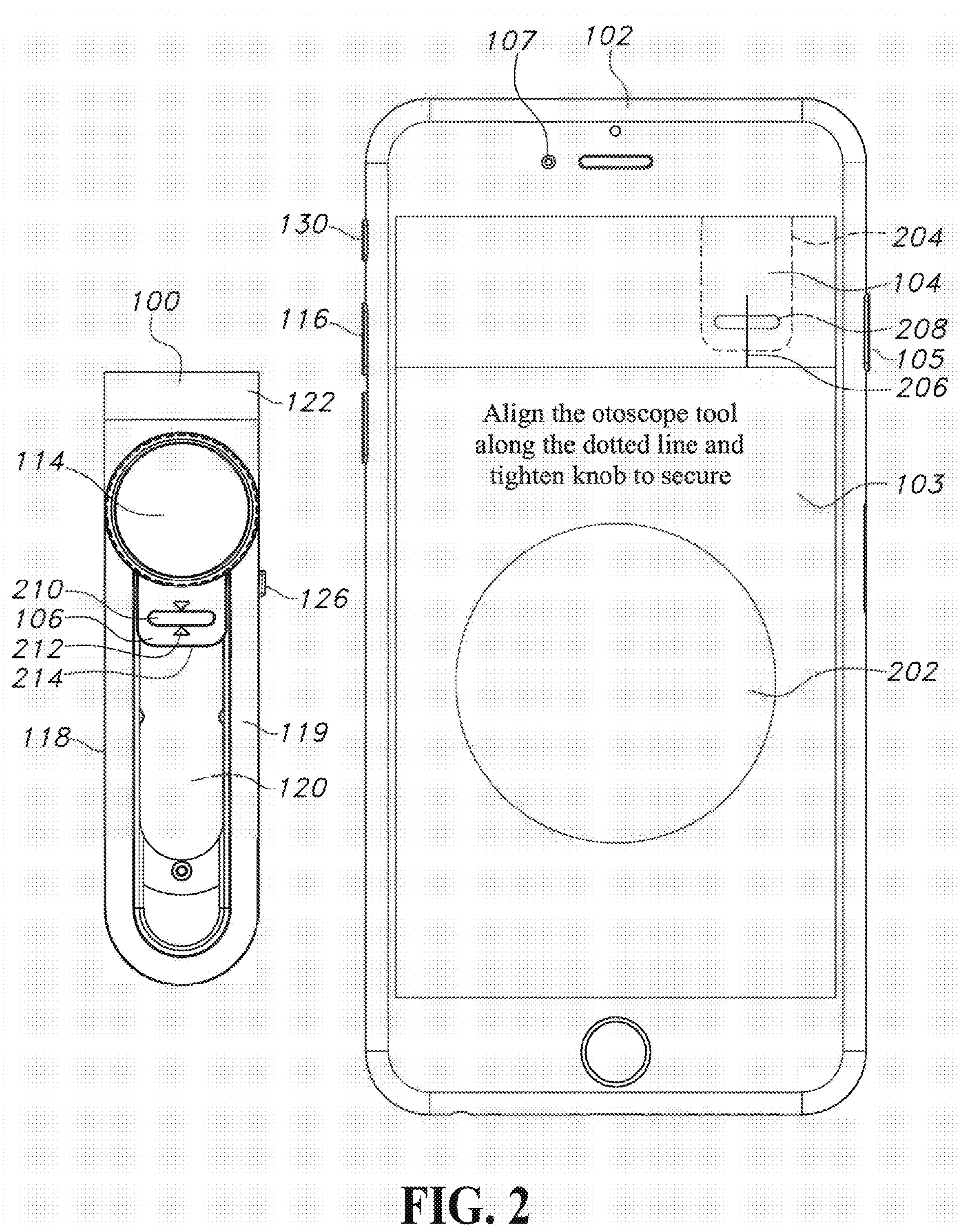
FIG. 2 depicts a perspective view of an otoscope clip device that comprises an alignment tab and a smart device that may comprise a screen that displays an alignment image.

FIG. 2 depicts a perspective view of an otoscope clip device that comprises an alignment tab and a smart device that may comprise a screen that displays and alignment image.

Smart device 102 may comprise a one or more buttons and/or switches. For example, smart device 102 may comprise the switch 130, the volume buttons 116, and the button 105. The button 105 may be an On/Off button, a push button, a switch, and/or the like. The smart device may include a camera, such as the camera 107, which may face a user. The smart device may include a display, such as display 103.

Display 103 may provide instructions to a user as to how to align the otoscope clip device 100. Display 103 may include image 202, which may be an image taken from the smart device camera. When otoscope clip device 100 may be attached to smart device 102 an image may be taken. For example, an image may be taken through an otoscope. For example, otoscope clip device 100 may include the otoscope assembly 120. When otoscope clip device 100 is attached to smart device 102, the otoscope assembly 120 may be aligned with a smart device camera and an image and/or video may be taken through the otoscope associated with the otoscope assembly 120.

Display 103 may display the alignment image 104. The alignment image 104 may be used to assist a user in aligning and otoscope with a smart device camera when the user is attaching the otoscope clip device 100 to smart device 102. The alignment image 104 may depict a shape that may be similar and/or complementary to alignment tab 106 of the otoscope clip device 100. When the alignment tab 106 may be placed within alignment image 104, an otoscope associated with the otoscope assembly 120 may be aligned and/or may be in contact with a smart device camera.

The alignment image 104 may include a number of features that may assist in aligning the alignment image 104 with the alignment tab 106 and/or the otoscope associated with the otoscope assembly 120. These features may include a shape of the alignment image 104, the color of the alignment image 104, a shape within the alignment image 104, an object within the alignment image 104, a color within the alignment image 104, a combination thereof, and/or the like. The alignment image 104 may include the alignment image outline 204, the horizontal alignment image feature 206, the vertical alignment image feature 208, a combination thereof, and/or the like.

The alignment image 104 may be used by a user to determine how to move the otoscope clip device 100 to achieve alignment. Alignment image 104 may be used by the user to determine how to move the otoscope clip device 100 in an axis associated with a plane created by the display 103. For example, display 103 may have a horizontal axis that may cross a first side of smart device 102 that may include volume button 116 to a second side of smart device 102 that may include button 105. Display 103 may have a vertical axis that may be orthogonal to the horizontal axis. The alignment image 104 may provide a user with visual feedback as to how to move the otoscope clip device 100 in the vertical axis and/or the horizontal axis of the display 103, which may align the otoscope with a smart device camera.

The alignment image outline 204 may allow user to align the alignment tab 106 of the otoscope clip device 100 such that the otoscope associated with the otoscope assembly 120 may be aligned with the smart device camera. The alignment image outline 204 may be used by the user to align the alignment tab 106 in the vertical axis and/or the horizontal axis of the display 103. For example, the user may place the alignment tab 106 on, near, or within the alignment image outline 204 to achieve alignment. If otoscope is misaligned with the smart device camera, a portion of the alignment tab 106 may appear outside of the alignment image outline 204. The user may adjust otoscope clip device 100 to address the portion of the alignment tab 106 that may be outside of the alignment image outline 204 and may align the otoscope with the device camera. By correcting the misalignment of the alignment tab 106 with the alignment image outline 204, the user may correct the alignment of the otoscope with the smart device camera.

The alignment image outline 204 may be larger (e.g., slightly larger) than the alignment tab 106 such that alignment tab 106 may fit within the alignment image 104 and the alignment image outline 204 may be seen. The alignment image outline 204 may be the same or of a similar color to alignment image 104, the alignment tab 106, and/or the alignment tab edge 214. The alignment image outline 204 may be a different color than the alignment image 104, the alignment tab 106, and/or the alignment tab edge 214.

The horizontal alignment image feature 206 may be used by the user to determine how to move the otoscope clip device 100 to achieve alignment. The horizontal alignment image feature 206 may be a line, an object, a shape, an icon, and indicator, and/or the like. For example, the horizontal alignment image feature 206 may be a line elongated in a vertical direction. The horizontal alignment image feature 206 may be within alignment image 104, may be outside alignment image 104, and/or may intersect the alignment image outline 204. The horizontal alignment image feature 206 may be used by a user to determine how to move the otoscope clip device 100 along a horizontal axis associated with the display 103 to horizontally align the otoscope associated with the otoscope assembly 120 with the smart device camera.

To provide guidance as to how to move the otoscope clip device 100 along the horizontal axis, the horizontal alignment image feature 206 may have one or more reference points. For example, the horizontal alignment image feature 206 may be a number of dots along a vertical axis, a line along the vertical axis, a shape elongated along the vertical axis, an indicator along the vertical axis, and/or the like.

To align the otoscope with the smart device camera along the horizontal axis, a user may attach otoscope clip device 100 on smart device 102 such that the horizontal alignment tab feature 212 may be aligned with horizontal alignment image feature 206. For example, the user may align the arrow or triangular protrusions of horizontal alignment tab feature 212 with the line of horizontal alignment image feature 206.

The vertical alignment image feature 208 may be used by the user to determine how to move the otoscope clip device 100 to achieve alignment. The vertical alignment image feature 208 may be a line, an object, a shape, an indicator, an icon, and/or the like. For example, the vertical alignment image feature 208 may be an oval elongated along the horizontal axis. The vertical alignment image feature 208 may be within alignment image 104, may be outside alignment image 104, and/or may intersect the alignment image outline 204. The vertical alignment image feature 208 may be used by a user to determine how to move the otoscope clip device 100 along the vertical axis associated with the display 103 to vertically align the otoscope associated with the otoscope assembly 120 with the smart device camera.

To provide guidance as to how to move the otoscope clip device 100 along the vertical axis, the vertical alignment image feature 208 may have one or more reference points. For example, the vertical alignment image feature 208 may be a number of dots along a horizontal axis, a line along the horizontal axis, a shape elongated along the horizontal axis, an indicator along the horizontal axis, and/or the like.

To align the otoscope with the smart device camera along the vertical axis, a user may attach otoscope clip device 100 on smart device 102 such that the vertical alignment tab feature 210 may be aligned with vertical alignment image feature 208. For example, the user may align the oval aperture of vertical alignment tab feature 210 with the vertical alignment image feature 208.

Otoscope clip device 100 may comprise the clip assembly 122 and the otoscope assembly 120. The otoscope assembly 120 may include an otoscope and may include a light for the otoscope. The otoscope assembly 120 may include light switch 126 that may control the light for the otoscope. Although a switch is shown with respect to the light switch 126, another suitable element, such as a button, may be used.

The inside portion of the otoscope assembly 120 may be seen in FIG. 2. When otoscope clip device 100 may be attached to smart device 102, the inside portion of otoscope assembly 120 may face and/or contact a back portion of smart device 102 that may include a smart device camera.

The clip assembly 122 may comprise a clamp assembly that may include knob 114. The clip assembly 122 may comprise clip engagement member 118. The clip assembly 122 may comprise alignment tab 106.

The alignment tab 106 may include a number of features that may assist in aligning the alignment tab 106 with the alignment image 104 and/or the otoscope associated with the otoscope assembly 120. These features may include a shape of the alignment tab 106, the color of the alignment tab 106, a shape within the alignment tab 106, an object within the alignment tab 106, a color within the alignment tab 106, a combination thereof, and/or the like. The alignment tab 106 may include the alignment tab edge 214, the horizontal alignment tab feature 212, the vertical alignment tab feature 210, a combination thereof, and/or the like.

The alignment tab 106 may be used by a user to determine how to move the otoscope clip device 100 to achieve alignment. Alignment tab 106 may be used by a user to determine how move the otoscope clip device 100 in an axis associated with a plane created by the display 103. For example, display 103 may have a horizontal axis that may cross a first side of smart device 102 that includes volume button 116 to a second side of smart device 102 that includes button 105. Display 103 may have a vertical axis that may be orthogonal to the horizontal axis. The alignment tab 106 may provide a user with feedback as to how to move the otoscope clip device 100 in the vertical axis or the horizontal axis of the display 103, which may align the otoscope with a smart device camera.

The alignment tab edge 214 may allow user to align the alignment tab 106 of the otoscope clip device 100 such that the otoscope associated with the otoscope assembly 120 may be aligned with the smart device camera. The alignment tab edge 214 may be used by the user to align the alignment tab 106 in the vertical axis and the horizontal axis of the display 103. For example, the user may place the alignment tab edge 214 on, near, or within the alignment image outline 204 to achieve alignment. If otoscope is misaligned with the smart device camera, a portion of the alignment tab edge 214 may appear outside of the alignment image outline 204. The user may adjust otoscope clip device 100 to address the portion of the alignment tab edge 214 that may be outside of the alignment image outline 204 and may align the otoscope with the device camera. By correcting the misalignment of the alignment tab edge 214 with the alignment image outline 204, the user may correct the alignment of the otoscope with the smart device camera.

The alignment tab edge 214 may be an edge of the alignment tab that may be parallel and may be in contact with the phone screen. The alignment tab edge 214 may fit within the alignment image 104 such that the alignment image outline 204 may be seen. The alignment tab edge 214 may be shaped to help reveal the alignment image outline 204 when the alignment tab edge 214 may be placed on top of or over the alignment image outline 204. For example, the alignment tab edge 214 may be created by tapering, chamfering, rounding, or filleting an edge of alignment tab 106. The alignment tab edge 214 may be complementary and/or the same shape as the alignment image outline 204.

The alignment tab edge 214 may be the same color as or a similar color to alignment image 104, the alignment tab 106, and/or the alignment image outline 204. The alignment tab edge 214 may be a different color than the alignment image 104, the alignment tab 106, and/or the alignment image outline 204.

The horizontal alignment tab feature 212 may be used by a user to determine how to move the otoscope clip device 100 to achieve alignment. The horizontal alignment tab feature 212 may be a line, an object, a shape, an indicator, an icon, an etching, and/or the like. The horizontal alignment tab feature 212 may be a clear portion or a window of the alignment tab 106. The horizontal alignment tab feature 212 may be an oval elongated in the vertical axis. The horizontal alignment tab feature 212 may be a pill shape elongated along the vertical axis.

The horizontal alignment tab feature 212 may be a first arrow shaped protrusion and a second arrow shaped protrusion that are placed a distance from each other in a vertical direction. The first arrow shaped protrusion and the second arrow shaped protrusion may be designed to point at each other.

In an example, the horizontal alignment tab feature 212 may comprise a first aperture and a second aperture that are a distance from each other. The first aperture and the second aperture may be complementary to one or more objects within the alignment image 104. For example, the first aperture may be aligned with a first circle within the alignment image 104, and the second aperture may be aligned with a second circle within the alignment image 104.

The horizontal alignment tab feature 212 may be aligned with a feature that may be within alignment image 104, may be outside alignment image 104, and/or may intersect the alignment image outline 204. The horizontal alignment tab feature 212 may be used by a user to determine how to move the otoscope clip device 100 along a horizontal axis associated with the display 103 to horizontally align the otoscope associated with the otoscope assembly 120 with the smart device camera.

To provide guidance as to how to move the otoscope clip device 100 along the horizontal axis, the horizontal alignment tab feature 212 may have one or more reference points. For example, the horizontal alignment tab feature 212 may be a number of dots along an axis, a line along the axis, a shape elongated along the axis, an indicator along the axis, and/or the like.

To align the otoscope with the smart device camera along the horizontal axis, a user may attach otoscope clip device 100 on smart device 102 such that the horizontal alignment tab feature 212 may be aligned with horizontal alignment image feature 206. For example, the user may align the arrow or triangular protrusions of horizontal alignment tab feature 212 with the line of horizontal alignment image feature 206.

The vertical alignment tab feature 210 may be used by a user to determine how to move the otoscope clip device 100 to achieve alignment. The vertical alignment tab feature 210 may be a line, an object, a shape, an indicator, an icon, an etching, and/or the like. The vertical alignment tab feature 210 may be a clear portion or a window of the alignment tab 106. The vertical alignment tab feature 210 may be an oval elongated along the horizontal axis. The vertical alignment tab feature 210 may be a pill shape (e.g., an oval) elongated along the horizontal axis. The vertical alignment tab feature 210 may align with a feature that may be within the alignment image 104, may be outside the alignment image 104, and/or may intersect the alignment image outline 204. The vertical alignment tab feature 210 may be used by a user to determine how to move the otoscope clip device 100 along the vertical axis associated with the display 103 to vertically align the otoscope associated with the otoscope assembly 120 with the smart device camera.

In an example, the vertical alignment tab feature 210 may comprise a first arrow shaped protrusion and a second arrow shaped protrusion that are placed a distance from each other in a horizontal direction. The first arrow shaped protrusion and the second arrow shaped protrusion may be designed to point at each other.

In another example, the vertical alignment tab feature 210 may comprise a first aperture and a second aperture that are a distance from each other. The first aperture and the second aperture may be complementary to one or more objects within the alignment image 104. For example, the first aperture may be aligned with a first circle within the alignment image 104, and the second aperture may be aligned with a second circle within the alignment image 104.

To provide guidance as to how to move the otoscope clip device 100 along the vertical axis, the vertical alignment tab feature 210 may be one or more reference points. For example, the vertical alignment tab feature 210 may be a number of dots along an axis, a line along the axis, a shape elongated along the axis, an indicator along the axis, and/or the like.

To align the otoscope with the smart device camera along the vertical axis, a user may attach otoscope clip device 100 on smart device 102 such that the vertical alignment tab feature 210 may be aligned with vertical alignment image feature 208. For example, the user may align the oval aperture of vertical alignment tab feature 210 with the vertical alignment image feature 208.

Figure 3:
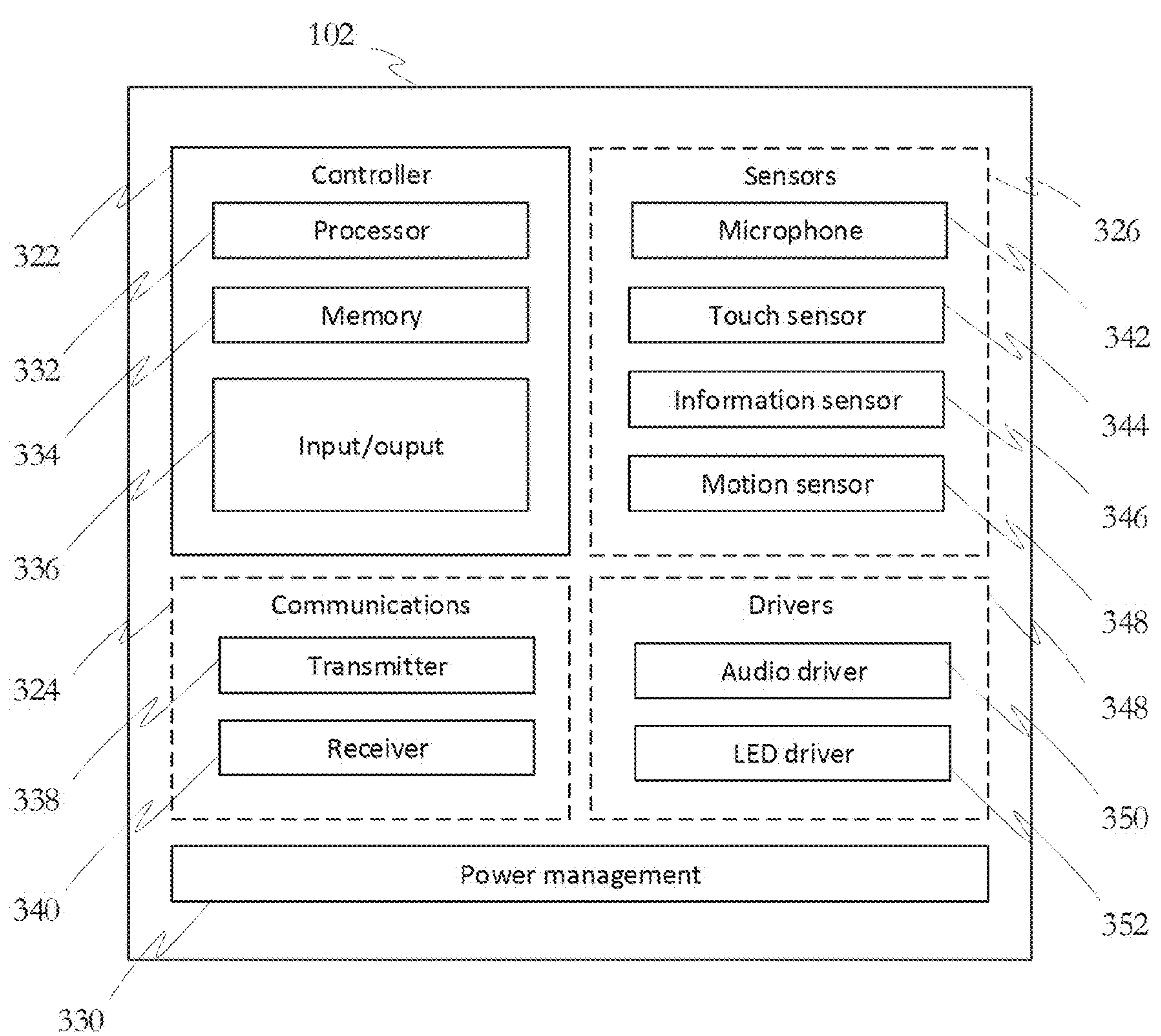
FIG. 3 is a functional block diagram of electrical components that may be part of the example smart device.

FIG. 3 is a functional block diagram of electrical components of the example smart device 102. These components 102 may be incorporated into a smart device, such as device 102. The smart device may be a cellular phone, a smart phone, a smart tablet, a computer, and the like. For example, the smart device 102 may be an iPhone, an Android phone, an iPad, an Android tablet, and the like.

The smart device 102 may integrate sensing, electromechanical driving, communications, and digital-processing functionality. In an example, the components in the smart device 102 may include a controller 322, communications interfaces 324, sensors 326, electrical and electromechanical drivers 348, and a power management subsystem 330.

The controller 322, may include a processor 332, a memory 334, and one or more input/output devices 336, for example. The controller 322 may be any suitable microcontroller, microprocessor, field programmable gate array (FPGA), application specific integrated circuit (ASIC), or the like, that is suitable for receiving data, computing, storing, and driving output data and/or signals. The controller 322 may be a device suitable for an embedded application. For example, the controller 322 may include a system on a chip (SOC).

The processor 332 may include one or more processing units. The processor 332 may be a processor of any suitable depth to perform the digital processing requirements disclosed herein. For example, the processor 332 may include a 4-bit processor, a 16-bit processor, a 32-bit processor, a 64-bit processor, or the like.

The memory 334 may include any component or collection of components suitable for storing data. For example, the memory 334 may include volatile memory and/or non-volatile memory. The memory 334 may include random-access memory (RAM), read-only memory (ROM), erasable programmable read-only memory (EPROM), (electrically erasable programmable read-only memory) EEPROM, flash memory, or the like.

The input/output devices 336 may include any devices suitable for receiving and/or sending information. This information may be in the form of digitally encoded data (from other digital components, for example) and/or analog data (from analog sensors, for example). The input/output devices 336 may include devices such as serial input/output ports, parallel input/output ports, universal asynchronous receiver transmitters (UARTs), discrete logic input/output pins, analog-to-digital converters, digital-to-analog converters. The input/output devices 336 may include specific interfaces with computing peripherals and support circuitry, such as timers, event counters, pulse width modulation (PWM) generators, watchdog circuits, clock generators, and the like. The input/output devices 336 may provide communication within and among the components in the smart device 102, for example, communication between the controller 322 and the sensors 326, between the controller 322 and the drivers 348, between the controller 322 and the communications interfaces 324, and between the controller and the power management subsystem 330, and as a conduit for any other combination of components in the smart device 102. The components in the smart device 102 may support direct communication as well, for example, between a sensor 326 and the power management system 330.

The communications interfaces 324 may include a transmitter 338 and/or a receiver 340. Communication interfaces 324 may include one or more transmitters 338 and/or receivers 340. The transmitter 338 and receiver 340 may include any electrical components suitable for communication to and/or from the electrical components in the smart device 102. For example, the transmitter 338 and receiver 340 may provide wireline communication and/or wireless communication to devices external to the components in the smart device 102 and/or external to the device 102 within which the components are integrated.

The transmitter 338 and receiver 340 may enable wireline communication using any suitable communications protocol, for example, protocols suitable for embedded applications. For example, the transmitter 338 and receiver 340 may be configured to enable universal serial bus (USB) communication, Ethernet local-area networking (LAN) communications, and the like.

The transmitter 338 and receiver 340 may enable wireless communications using any suitable communications protocol, for example, protocols suitable for embedded applications. For example, the transmitter 338 and receiver 340 may be configured to enable a wireless personal area network (PAN) communications protocol, a wireless LAN communications protocol, a wide area network (WAN) communications protocol and the like. The transmitter 338 and receiver 340 may be configured to communicate via Bluetooth, for example, with any supported or custom Bluetooth version and/or with any supported or custom protocol, including for example, A/V Control Transport Protocol (AVCTP), A/V Distribution Transport (AVCTP), Bluetooth Network Encapsulation Protocol (BNEP), IrDA Interoperability (IrDA), Multi-Channel Adaptation Protocol (MCAP), and RF Communications Protocol (RFCOMM), and the like. In an example, the transmitter 338 and receiver 340 may be configured to communicate via Bluetooth Low Energy (LE) and/or a Bluetooth Internet of Things (IoT) protocol. The transmitter 338 and receiver 340 may be configured to communicate via local mesh network protocols such as ZigBee, Z-Wave, Thread, and the like, for example. Such protocols may enable the transmitter 338 and receiver 340 to communicate with nearby devices such as the user's cell phone and/or a user's smartwatch. And communication with a local networked device, such as a mobile phone, may enable further communication with other devices across a wide area network (WAN) to devices remote, on the Internet, on a corporate network, and the like.

The transmitter 338 and receiver 340 may be configured to communicate via LAN protocols such as 802.11 wireless protocols like Wi-Fi, including but not limited to, communications in the 2.4 GHz, 5 GHz and 60 GHz frequency bands. Such protocols may enable the transmitter 338 and receiver 340 to communicate with local network access point, such as a wireless router in a user's home or office, for example. And communication with a local network access point may enable further communication with other devices present on the local network or across a WAN to devices remote, on the Internet, on a corporate network, and the like.

The transmitter 338 and receiver 340 may be configured to communicate via mobile wireless protocols such as global system for mobile communications (GSM), 4G long-term evolution protocol (LTE), 5G, and 5G new radio (NR), any variety of mobile Internet of things (IoT) protocols, a combination thereof, and/or the like. Such protocols may enable the transmitter 338 and receiver 340 to communicate more readily, for example when a user is mobile, traveling away from home or office, and without manual configuration.

The sensors 326 may include any device suitable for sensing an aspect of its environment such as physical, chemical, mechanical, electrical, encoded information, and the like. The controller 322 may interact with one or more sensors 326. The sensors 326 may include, for example a microphone 342, a fingerprint sensor 344, an information sensor 346, a motion sensor 350, and the like.

The microphone 342 may include a transducer element of a microphone is called its element or capsule that may be used to capture sound. The microphone may use a diaphragm to convert mechanical motion caused by sound waves to an electrical signal. The microphone 342 may include be used by the smart device to record audio signals from a user, from an environment, and/or the like. The microphone 342 may provide the audio signals to other components within the smart device 102.

The touch sensor 344 may be any sensor suitable for detecting a touch from a user. In an example, a mechanical arrangement may translate the force and/or movement from a finger of a user to the touch sensor 344. The touch sensor 344 may include a magnetic field sensor, such as a small-scale micro-electromechanical system (MEMS) magnetic field sensor, a contact closure, a reed switch, a potentiometer, a force sensor, a push button, or the like. In an example, a user may touch a display of the device 102 and the touch sensor 344 may detect that the display has been touched by the user. In another example, a user may touch a button on the device 102, and the touch sensor 344 may detect the touch and may determine a fingerprint of the user.

The information sensor 346 may include any sensor suitable for reading stored information. In an embedded application with a physical platform, information may be encoded and stored on a variety a media that may be incorporated into aspects of physical design. For example, information about the otoscope clip device, the otoscope, and/or the removable optical device may be encoded and stored in a way that is physically associated with the otoscope clip device itself. In an example, the information may be encoded on otoscope clip device in a quick read (QR) code, in a readable integrated circuit, such as a one-wire identification chip, in a near-field communications (NFC) tag, in physical/mechanical keying, in a Subscriber Identification Module (SIM), or the like. In an example, the function of the information sensor 346 may be performed via logic and programming to receive QR code information. The user may use the smart device 102 to scan the QR code, and the information sensor 346 may communicate the information to the controller 322 via communications devices 324. In an embodiment, the information sensor 346 may also be suitable for writing information back onto the medium associated with the otoscope clip device, such as with a read/writable NFC tag, for example.

Once the information has been acquired by the information sensor 346 and communicated to the processor 332, the processor 332 may identify and authenticate the otoscope clip device. The processor may perform any digital algorithm suitable for identification and/or authentication, such as traditional cryptographic algorithms, public/private key cryptography, security token processing, remote database look-up, blockchain processing, and/or the like.

The motion sensor 348 may include any sensor suitable for determining relative motion, acceleration, velocity, orientation, and/or the like of the device 102. The motion sensor 348 may include a piezoelectric, piezoresistive, and/or capacitive component to convert physical motion into an electrical signal. For example, the motion sensor 348 may include an accelerometer. The motion sensor 348 may include a microelectromechanical system (MEMS) device, such as a MEMS thermal accelerometer. The motion sensor 348 may be suitable for sensing a user motion such as a user holding the device 102. The motion sensor 348 may communicate this information via the input output/devices 336 to the processor 332 for processing.

The device 102 may include one or more drivers 348 to communicate feedback to a user and/or to drive a mechanical action. The drivers 348 may include an audio driver 350, a light emitting diode (LED) driver 352, and the like. Other drivers 348 may include haptic feedback drivers, audio output drivers, heating element drivers, and/or the like.

The audio driver 350 may include any circuitry suitable for driving a speaker. The audio driver 352 may be controllable by the processor 332 via the input/output devices 336. The audio driver 352 may be used to send audio signals to a speaker that belongs to the phone. For example, sounds, such as directions, phone calls, music, sound notifications, and the like may be delivered to a user via a speaker that may be driven by the audio driver 352.

The LED driver 352 may include any circuitry suitable for illuminating an LED. The LED driver 352 may be controllable by the processor 332 via the input/output devices 336. The LED driver 352 may be used to turn a light for a camera. The LED driver 352 may include a multicolor LED driver.

The power management subsystem 330 may include circuitry suitable for managing and distributing power to the components 102. The power management subsystem 330 may include a battery, a battery charger, and a direct current (DC) power distribution system, for example. The power management subsystem 330 may communicate with the processor 332 via the input/output devices 336 to provide information such as battery charging status. The power management subsystem 330 may include a replaceable battery and/or a physical connector to enable external charging of the battery.

Figure 4A:
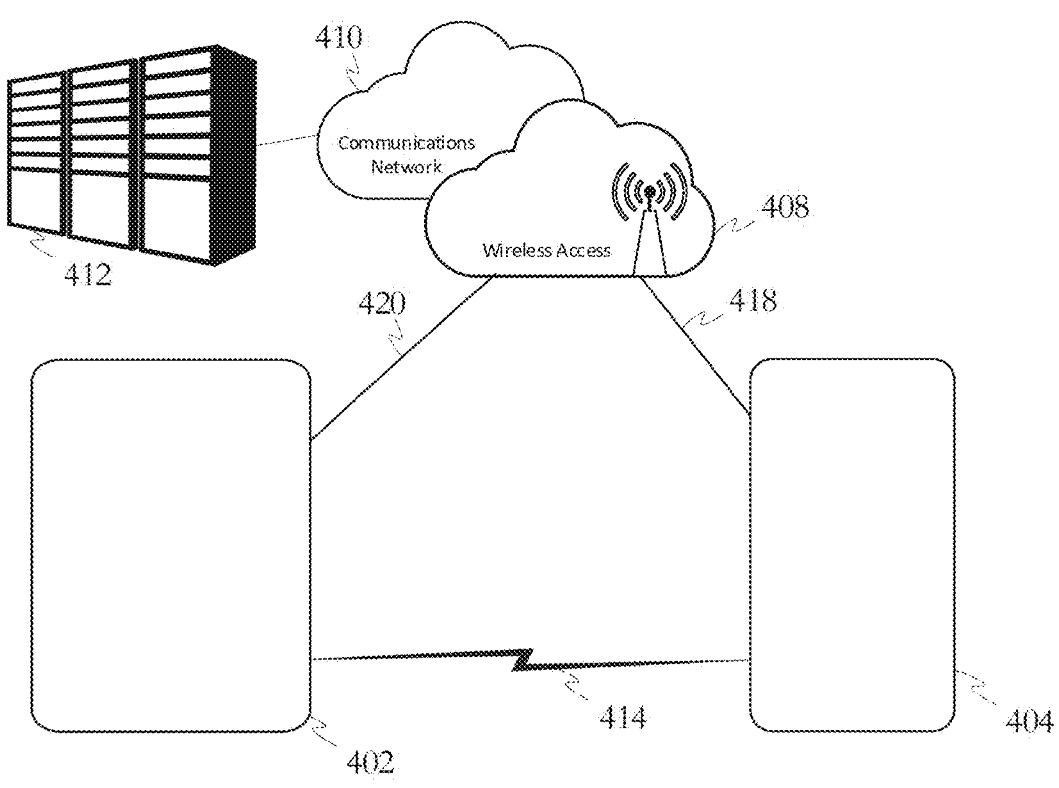
FIG. 4A is an architecture diagram for an example system to support a smart device

FIG. 4A is an architecture diagram for an example system to support a smart device 204. The smart device 404 may be a smart phone, such as the smart device 102 described in FIGS. 1A-D, for example. The system may include the smart device 404, a smart device 404 with a corresponding telemedicine application (which may include alignment software for aligning an otoscope with a camera), a wireless access network 408, a communications network 410, and a computing resources 412.

The smart device 404 may include a telemedicine application for a patient. The smart device 404 may provide a primary user interface for a personalized telemedicine experience, which may include using an otoscope clip device to provide images of an outer ear, middle ear, and/or ear canal of a patient. The smart device 404 may provide passive or active tracking and/or location services.

In an example, the smart device 404 may direct a user to a telemedicine website or application. For example, the smart device 404 may provide the user with a link that the user may click, which may bring the user to a telemedicine website.

The smart device 404 may provide data storage and processing functionality. The smart device 404 may determine and analyze data that may assist in the alignment of the otoscope that belongs to the otoscope clip device. For example, the smart device 404 may include a file, a table, a database, and/or the like that may be used to determine where an alignment image may be displayed on a display according to the model of the device.

The smart device 402 may include a telemedicine application for a healthcare provider. The smart device 402 may a be smart phone, a smart tablet, a computer, and/or the like. The smart device 402 may allow a healthcare provider to consult with a patient regarding a medical issue, such as a potential ear infection. The smart device 402 may receive data from the smart device 404, which may include an image and/or video of the outer ear, the middle ear, and/or the ear canal from a patient. For example, a patient may use an otoscope clip device that is attached to smart device 404 to take a video of the tympanic membrane, send the video of the tympanic membrane to smart device 404 where a doctor may review the video. The computing resources 412 may provide data storage and processing functionality. The computing resources 412 may receive and analyze data that may assist in the alignment of the otoscope that belongs to the otoscope clip device. For example, the computing resources 412 may send data to smart device 404 that indicates where an alignment image may be displayed on a display according to the model of the device.

The components of the system may communicate with each other over various communications protocols. The smart device 402 may communicate with a smart device 404 via a Bluetooth wireless link 414, for example. The smart device 404 may communicate with the smart device 404 via wireless link 420 and wireless link 418. The smart device 404 may communicate with the wireless access network 408 over a wireless link 418 for example. The wireless link 418 may include any suitable wireless protocol, such as 802.11 wireless protocols like Wi-Fi, GSM, 4G LTE, 5G, and 5G NR, and any variety of mobile IoT protocols.

The communications network 410 may include a long-distance data network, such as a private corporate network, a virtual private network (VPN), a public commercial network, an interconnection of networks, such as the Internet, or the like. The communications network 410 may provide connectivity to the computing resources 412.

The computing resources 412 may include any server resources suitable for remote processing and/or storing of information. For example, the computing resources 412 may include a server, a cloud server, data center, a virtual machine server, and the like. In an embodiment, the smart device 404 may communicate with the computing resources 412 via the wireless link 418. And in an embodiment, the device 404 may communicate with the computing resources 412 via its own wireless link 420.

The system may enable the collection and/or processing of information related to an alignment of an otoscope that may be attached to a camera of smart device 404. The system may enable the generation and/or determination of alignment support data for the telemedicine experience. For example, smart device 404 may initiate a telemedicine session with smart device 404. The healthcare provider may request that the patient record a video showing the ear canal of the patient. The video may allow the healthcare provider to determine if the patient has an ear infection. The smart device 404 may prompt the patient to attach an otoscope clip device to the smart device 404. The smart device 404 may determine an alignment image to display on the display of the smart device 404 to aid the patient in aligning the otoscope of the otoscope clip device with the camera of the smart device 404. In an example, the smart device 404 may inform computing resources 412 of the model associated with the smart device 404 and may receive an indication of the location of where to display the alignment image from the computing resources 412. In an example, the smart device 404 may include a file, a table, and/or a database which the smart device 404 may use to receive an indication of the location to display the alignment image. The smart device 404 may display the alignment image. The patient may align an alignment tab of the otoscope clip device with the alignment image, for example, by placing the alignment tab on, near, or within the alignment image to align the otoscope with the camera of the smart device 404. The patient may use the otoscope clip device that is attached to the smart device 404 to record the video of the ear canal of the patient and may send the video to the smart device 402.

The telemedicine app on the smart device 404 and/or the computer resources 412 may generate and/or determine the alignment image to be displayed on the smart device 404. The telemedicine app on the smart device 404 and/or the computer resources 412 may generate and/or determine information that may be used to display an alignment image. For example, this information may be used to display an alignment image at a location on the display of the smart device 404 that may allow the otoscope to be aligned with the camera when the alignment tab of the otoscope clip device is placed on, near, or within the alignment image. And this information may be used to drive a feedback loop to the user-providing notifications and encouragement that may further refine the alignment.

Figure 4B:
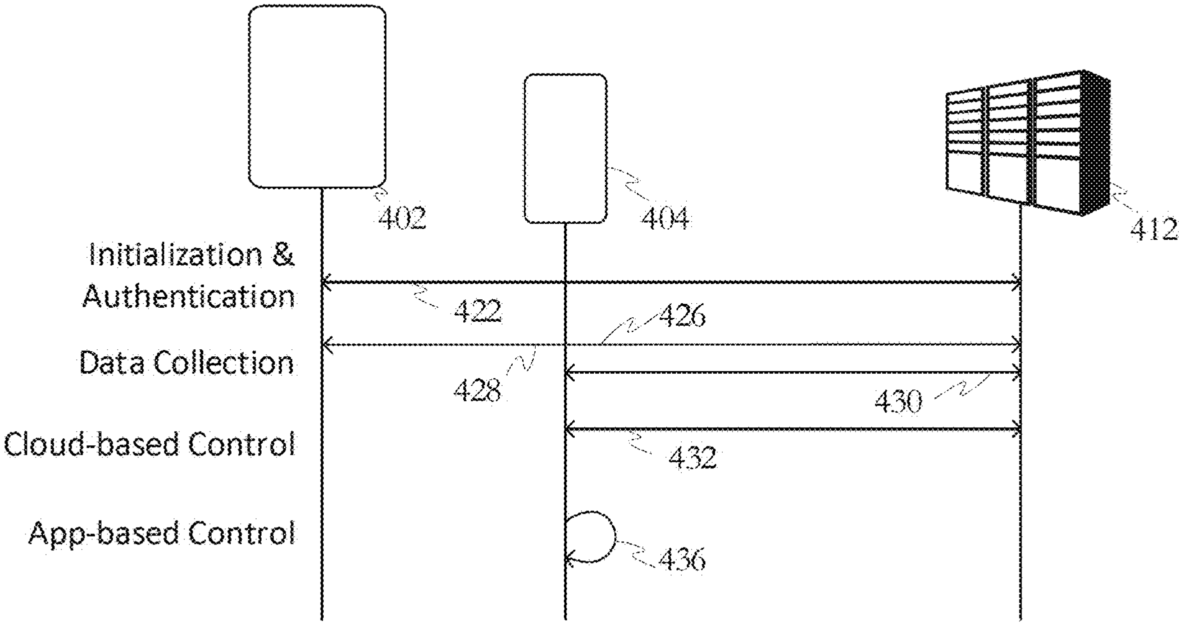
FIG. 4B is a messaging flow diagram for the example system to support the smart device.

FIG. 4B is an example messaging flow diagram for the example system shown in FIG. 4A. For example, the system may include communication and processing for functions such as initialization and authentication of the telemedicine application; data collection from a camera associated with the smart device 402; cloud base control, triggering, notification messaging and the like; app-based control, messaging and notifications, and the like; and/or telemedicine communication.

Initialization and authentication messages 422 may be exchanged between smart device 402, smart device 404, and/or computing resources 412. Initialization and authentication messages may be exchanged between the computing resources 412 and the smart device 404. For example, a new user may create a user account via the smart device 404. The account information may be processed by the computing resources 412. The new user may request a telemedicine session with a healthcare provider associated with smart device 404. That information may be communicated via messaging 422 to computing resources 412. Responsive information about user accounts, authentication, etc. may be messaged back to the smart device 404 and/or the smart device 402.

Data collection functionality may include messaging 426, which may occur between smart device 402, smart device 404, and/or computing resources 412. This messaging may include information such as activity information, recorded images, recorded videos, heart rate, heart rate variability, and other biometric information.

The system enables cloud-based control functions and app-based control functions. For example, an alignment image, a location for displaying an alignment image on a display, a determination of a camera location, and/or the like may be performed at computing resources 412 and/or smart device 404. If app-based control functions may be used, then smart device 404 may perform the requested functions at 436. If cloud-based functions may be used, then computing resources 412 may perform the requested functions and may provide data to smart device 404 as shown by messaging 432.

Figure 5:
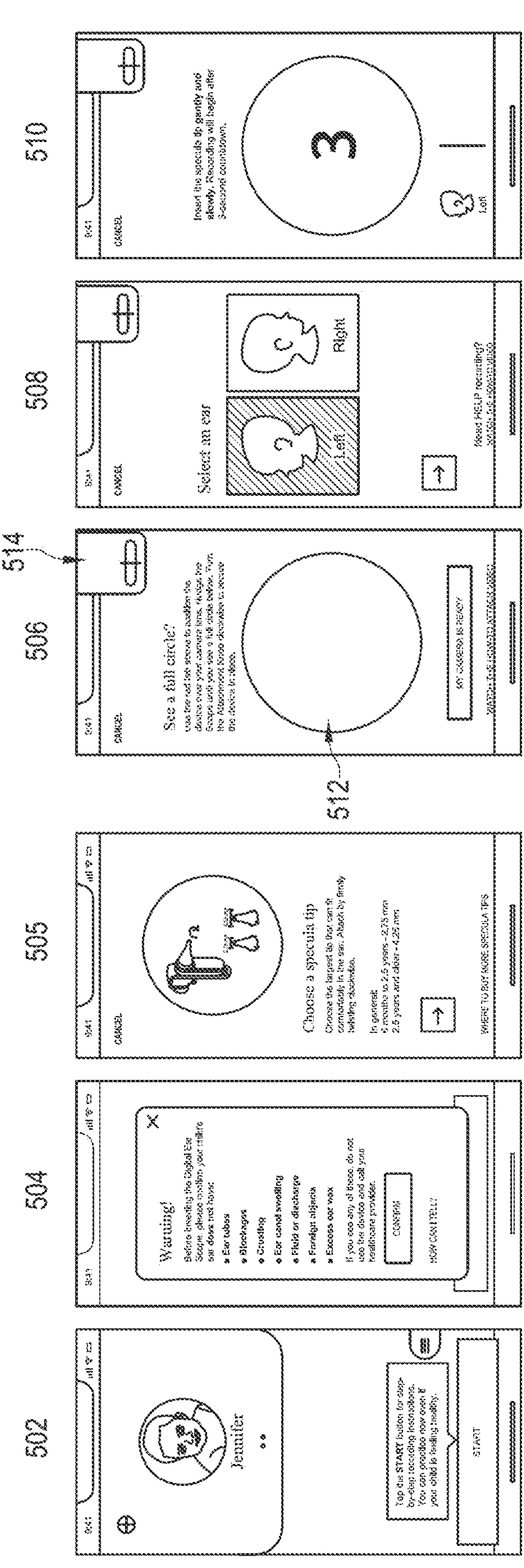
FIG. 5 depicts an example flow for assisting a user in aligning an otoscope with a camera using an alignment image.

FIG. 5 depicts an example flow for assisting a user in aligning an otoscope and a camera using an alignment image. At 502, a user may be asked to enter in and/or select a user profile. The user profile may include a user identity, a username, a profile picture, information regarding the user, medical information regarding the user or a patient, and the like. The user may select the user profile and press a button, such as a start button, to confirm their selection.

At 504, the user may be prompted with one or more warnings. The warning from the one or more warnings may be designed to guide the user to safely use the otoscope clip device. The warning may request the user to acknowledge that the patient does not have one or more symptoms or issues before using the otoscope. The one or more symptoms or issues may include ear tubes, ear blockages, ear crusting, ear canal swelling, ear fluid, ear discharge, a foreign object within an ear, excess ear wax, and the like.

In an example, the user may be prompted with a tutorial video. The tutorial video may explain how the otoscope clip device is intended to work with the smart device. The tutorial video may provide an overview of how to attach the otoscope clip device to the smart device and/or how to use to otoscope.

At 505, the user may be prompted to attach a speculum to the otoscope of the otoscope clip device. A speculum may come in a number of different sizes. For example, the speculum come in a child size and an adult size. As another example, the speculum may be a small size (e.g., for those 6 months to 2.5 years old) and a large size (e.g., for those over 2.5 years old).

The smart device may provide guidance to the user to assist the user in selecting a speculum size. For example, the smart device may display information with regard to selecting a speculum size. The user may select a speculum size, attach the speculum to the otoscope of the otoscope clip device, and may confirm their selection by pressing a button on the display of the smart device.

At 506, the user may be prompted to attach the otoscope clip device to the smart device. The smart device may display a video and/or image (e.g., a live video and/or image) from the camera at 512. The video and/or image may assist the user to align the otoscope with the camera. The smart device may display alignment image 514 to assist the user in aligning the otoscope with the camera.

The alignment image 514 may comprise one or more alignment image features. An alignment image feature may be used to align the removable optical element with the camera along one or more of a horizonal axis and a vertical axis. For example, an alignment image feature may be the edge of the alignment image, the color of the alignment image, a shape of the alignment image, a shape within the alignment image (e.g., an oval elongated along a horizontal axis within the alignment image 514), and the like.

The alignment image 514 may comprise a first alignment image feature, which may be an oval elongated along a horizontal axis within alignment image 514, and a second alignment image feature, which may be a line elongated along a vertical axis within the alignment image. The alignment image 514 may be alignment image 104 as disclosed herein. The alignment image 514 may comprise a third alignment image feature, which may be an edge of the alignment tab.

The alignment image 514 may be complementary to an alignment feature, such as an alignment feature that may belong to an alignment tab on the otoscope clip device. The alignment image 514 may allow a user to align the alignment image 514 with an alignment tab. When the alignment image 514 is aligned with the alignment tab, the viewing portion of the otoscope may be aligned with the smart device camera. Aligning the alignment image 514 with the alignment tab may allow the user to align the viewing portion of the otoscope with the smart device camera while minimizing a turning of the phone back and forth during the alignment. The alignment image 514 may include an alignment image outline, a horizontal alignment image feature, a vertical alignment image feature, a combination thereof, and/or the like.

A user may use the alignment image 514 to determine how to move the otoscope clip device to achieve alignment. For example, the user may use the alignment image 514 to determine that the otoscope clip device may be moved in an axis associated with a plane created by the display. The axis may be a horizontal axis of the display that may cross a first side of the smart device to a second side of the smart device. The axis may be a vertical axis of the display that may be orthogonal to the horizontal axis.

The alignment image 514 may include an alignment image outline. The alignment image outline may allow user to align the alignment tab of the otoscope clip device such that the otoscope associated with the otoscope assembly 514 may be aligned with the smart device camera. The alignment image outline 514 may be used by the user to align the alignment tab along the vertical axis and/or the horizontal axis of the display. For example, the user may place the alignment tab on, near, or within the alignment image outline to achieve alignment. If the otoscope is misaligned with the smart device camera, a portion of the alignment tab may appear outside of the alignment image outline. The user may adjust the otoscope clip device to address the portion of the alignment tab that may be outside of the alignment image outline and may align the otoscope with the device camera. By correcting the misalignment of the alignment tab with the alignment image outline, the user may correct the alignment of the otoscope with the smart device camera.

The alignment image 514 may include a horizontal alignment image feature. The horizontal alignment image feature may be used by the user to determine how to move the otoscope clip device to achieve alignment. The horizontal alignment image feature may be a line, an object, a shape, an icon, and indicator, and/or the like. For example, the horizontal alignment image feature may be a line elongated in a vertical direction. The horizontal alignment image feature may be within alignment image, may be outside alignment image, and/or may intersect the alignment image outline. The horizontal alignment image feature may be used by the user to determine how to move the otoscope clip device along a horizontal axis associated with the display to horizontally align the otoscope associated with the otoscope assembly with the smart device camera.

To provide guidance as to how to move the otoscope clip device along the horizontal axis, the horizontal alignment image feature may have one or more reference points. For example, the horizontal alignment image feature may be a number of dots along a vertical axis, a line along the vertical axis, a shape elongated along the vertical axis, an indicator along the vertical axis, and/or the like.

To align the otoscope with the smart device camera along the horizontal axis, a user may attach otoscope clip device on the smart device such that the horizontal alignment tab feature may be aligned with the horizontal alignment image feature. For example, the user may align the arrow or triangular protrusions of the horizontal alignment tab feature with the line of horizontal alignment image feature The alignment image 514 may include a vertical alignment image feature. The vertical alignment image feature may be used by the user to determine how to move the otoscope clip device to achieve alignment. The vertical alignment image feature may be a line, an object, a shape, an indicator, an icon, and/or the like. For example, the vertical alignment image feature may be an oval elongated in a horizontal direction. The vertical alignment image feature may be within alignment image, may be outside alignment image, and/or may intersect the alignment image outline. The vertical alignment image feature may be used by the user to determine how to move the otoscope clip device along the vertical axis associated with the display to vertically align the otoscope associated with the otoscope assembly with the smart device camera.

The alignment image 514 may be displayed with a visual effect. This visual effect may allow the alignment image to appear more prominently to attract a user's attention. The visual effect may be a pulsing effect, a color change effect, a size change effect, a fade-in effect, and the like. For example, the alignment image 514 may pulse as it is displayed to indicate to a user where an alignment tab of the otoscope attachment device should be displayed. For example, the alignment image 514 may pulse to indicate to the user that it is time to place the otoscope clip device onto the smart device.

An alignment tab of an otoscope clip, such as alignment tab 106 described herein, may comprise one or more alignment tab features that may assist in aligning the otoscope with the camera. For example, the alignment tab may be placed within, near, or over the alignment image 514, such that one or more alignment tab features align with one or more alignment image features. The alignment tab may be aligned with the alignment image when the otoscope may be aligned with the camera. For example, the otoscope may be aligned with the camera when the one or more alignment tab features are aligned with the one or more alignment image features.

An alignment image feature may be complementary to an alignment tab feature. For example, the first alignment image feature may be complementary to a first alignment tab feature or a portion of the first alignment tab feature, the second alignment image feature may be complementary to a second alignment tab feature or a portion of the second alignment tab feature, and the third alignment image feature may be complementary to a third alignment tab feature or a portion of the third alignment tab feature.

As shown in FIG. 5, the alignment image 514 may be placed at a location on the display of the smart device. For example, the alignment image 514 may be an icon or file that may be placed at a location (e.g., a correct location) to allow the otoscope to be aligned with the camera. The location on the display of the smart device may be determined in a number of ways. In an example, the smart device may determine the model identity of the smart device. The smart device may use the model identity to determine the location to display the alignment image on the smart device. The location may be stored in a database, table, and/or file that may be on the smart device and/or on another computing device (e.g., a server in the cloud). The smart device may use the model identity to look up a location that may be used to display the alignment image using from the database.

The smart device may determine one or more dimensions of a component of the smart phone and may use the one or more dimensions to determine a location to display the alignment image. The component may be a display, a camera, and/or the like. For example, the smart device may determine one or more dimensions that may indicate the center of the camera. The smart device may use those dimensions to determine a point on the display that may be associated with the center of the camera. For example, the point on the display may be intersected by an axis that is through the center of the camera and orthogonal to the display.

A dimension of a component of the smart phone may be a dimension from the edge of a display that may be used to display the alignment image. A dimension may be from an edge of the display to an edge of the alignment image. A dimension may be from an edge of the display to a center of the alignment image. A dimension may be from an edge of the smart device to a center of the camera. A dimension may be a resolution of a display that belongs to the smart phone. A dimension may be a density of a display, such as the pixels per square inch (PPI), that belongs to the smart phone.

The alignment image may be modified and/or generated based on the model of the smart device. For example, the alignment image may be displayed at one location and size for an iPhone 6, but may be displayed at another location and size for a Samsung Galaxy S. In an example, the alignment image may be displayed at one location and size for a first display resolution of a device, and may be displayed at another location and size for a second display resolution of a device.

The alignment image may be displayed with a visual effect (e.g., blinking, pulsing, etc.) to indicate when a user may attach the otoscope clip device to the smart device. The alignment image may indicate where a user may attach the otoscope clip device.

It may be determined that the otoscope clip device is aligned with the camera, for example, using a video captured by the camera. A user may view a video and/or image (e.g., a live video and/or image) from the camera at 512. The user may use the video to determine that the otoscope clip device is not aligned with the camera. For example, the user may determine that a portion of the otoscope may be appearing in the video, which may block a portion of the camera view. In an example, the user may determine that the otoscope clip device is aligned with the camera by viewing a full circle in the camera view.

A user may be able to determine that the otoscope clip device may be misaligned or detached by looking at a camera view (e.g., viewing a video and/or image from the camera) at 512. When the otoscope clip device moves away from the camera, the camera view displayed at 512 may look different. For example, a user may see that the camera view may be cut off or that there may be black shade near or around the edges. As another example, a user may see that the camera view may not be a clear circle (e.g., a full clear circle). The camera view at 512 may ensure that the content may be reflective of the alignment and the recording that may occur. This may assist the user in understanding how to align the otoscope clip device. This may assist the user in determining that the otoscope clip device is not aligned.

In an example, the user may be prompted to turn up the volume in order to hear audio guidance that may be provided. In an example, the user may be prompted with a diagram and/or image of an outer ear, an inner ear, and/or an ear canal to familiarize the user with what they may see.

At 508, the user may be prompted indicate which ear of a patient will be examined with the otoscope of the otoscope clip device. The user may indicate that a right ear may be examined, a left ear may be examined, or both. The user may indicate which ear is to be examined so that a recorded video may be labeled with the associated ear.

In an example, the user may be prompted with a tutorial video. The tutorial video may explain how the otoscope clip device is intended to work with the smart device. The tutorial video may provide an overview of how to attach the otoscope clip device to the smart device and/or how to use to otoscope.

In an example, the user may be prompted with visual and/or written instructions as to how to straighten an ear canal. The visual and/or written instructions may be based on the age of a patient. For example, instructions may be provided to show how to position a child to assist in straightening an ear canal.

At 510, the user may be prompted to place the speculum of the otoscope into the ear canal of the patient. A video and/or an image from the camera showing a view through the otoscope may be displayed on the display of the smart device. The smart device may provide instructions to the user as to how to improve the image, how to perform the examination, how long to record, and the like.

The smart device may display a countdown to indicate when the user should begin recording. For example, the user may insert the speculum gently and may begin recording after a three second countdown. The smart device may notify the user that videos and/or images are being recorded. The smart device may request that the user follow an arrow displayed toward the eardrum and may instruct the user to stop if anything blocks the view.

The smart device may display a countdown to indicate to the user that the user may continue to keep the speculum of the otoscope in the ear canal of the patient until the countdown has completed. This may be done, for example, to provide enough time to record a video of the outer ear, the middle ear, and/or the ear canal of the patient (e.g., the tympanic membrane).

Figure 6:
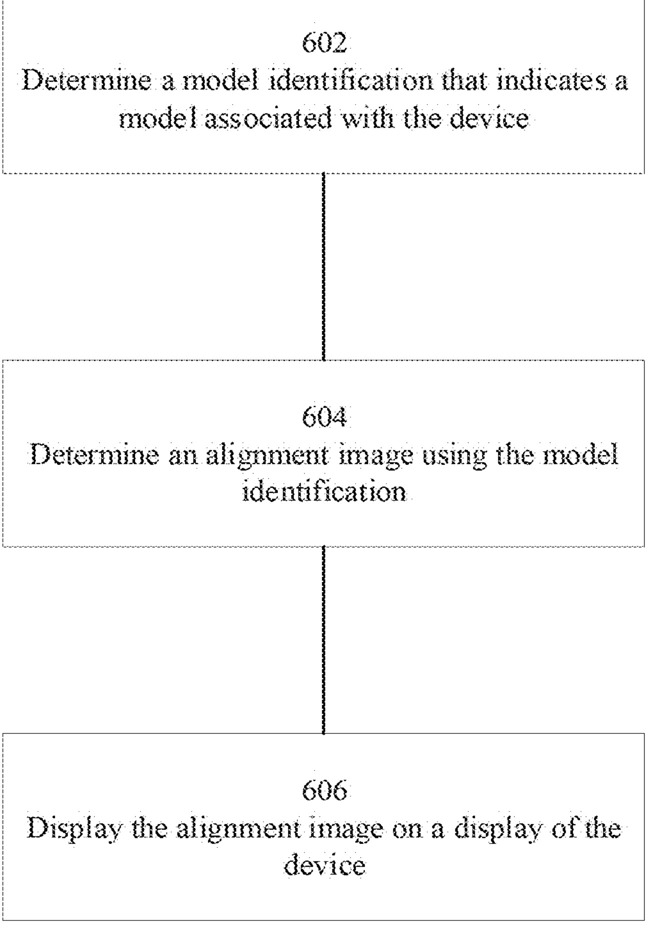
FIG. 6 depicts an example flow used by a smart device for providing an alignment image to assist a user in aligning an otoscope with a camera.

FIG. 6 depicts an example flow used by a smart device for providing an alignment image to assist a user in aligning an otoscope and a camera using an alignment image. The otoscope may belong to an otoscope clip device. The otoscope and/or the otoscope clip device may be referred to as a removable optical element.

At 602, the smart device may determine a model identification that may indicate a model associated with the device. The smart device may determine the model identification using an application programming interface (API) that is provided to the smart device. For example, the smart device may use the Apple iOS API to determine that the smart phone is an iPhone 6. Similar APIs may be made available to the smart device.

The smart device may determine the model identification from a memory on the smart device. For example, the smart device may retrieve the model identification from a SIM card that may belong to the smart device. The SIM card may include information with regarding the smart device, such as the model, a carrier that may be used by the smart device, an identification for the smart device, a user identification, and the like. In an example, the smart device may use the information from the SIM card to determine the model identification.

The smart device may determine the model identification from a server, such as a server associated with computing resources, such as the computing resources shown in FIGS. 4A-B. For example, the smart device may send a query to the server. The query may include information regarding the smart device, such as a subscription, a user identity, a smart device identity, and the like. The server may determine the model for the smart device and may send a message to this smart device that may include the model identification.

At 604, the smart device may determine an alignment image using the model identification. The alignment image may be generated, modified, retrieved, and/or determined by the smart device. For example, the alignment image may be retrieved from a local memory. The alignment image may be generated, modified, retrieved, and determined by a sever and may sent to the smart device. For example, the alignment image may be received from a server by the smart device.

The smart device may determine the alignment image using the model identification by performing a number of actions. For example, the smart device may use the model identification with a database and/or a table to determine the alignment image. The smart device may have a database and/or table that includes the location of cameras according to the model identification. The database and/or table may be located locally on the smart device, may be located on a remote database, or a combination of both. The smart device may look up the location of a camera in the database and/or table using the model identification. The smart device may use the location of the camera to determine a location on a display of the smart device to display the alignment image. As another example, the smart device may use the model identification to determine one or more dimensions that may be used to determine the alignment image. The one or more dimensions may be related to the display and/or the camera. For example, the smart device may use the model identification to determine the model of the smart phone, and may determine the display resolution of the smart phone. The smart device may use the model identification, the display resolution, smart device dimensions, and/or smart device parameters to determine the alignment image and/or a location to display the alignment image.

The smart device may use the model identification to determine a location of a camera that belongs to the smart device. The smart device may determine one or more dimensions that relate to the location of the camera, such as a distance from an edge of the smart device or a display resolution of the smart device. The smart device may use the one or more dimensions to determine a location on the display to display the alignment image. The smart device may use the camera location to determine the location on the display to display the alignment image. The smart device may determine a difference between the location of the camera and the display and may use that difference to generate the alignment image.

As another example, the smart device may use the model identification to determine one or more coordinates that indicate a center of a camera to determine the alignment image. The one or more coordinates may be determined using a database, a file, a data storage, and the like. The one or more coordinates may be calculated by determining a physical size of the smart device. The one or more coordinates may be calculated using a known coordinate for another component of the smart device, such as the display.

As another example, the smart device may use a display resolution and/or a density of a display to determine the alignment image. For example, the smart device may determine its display resolution, may determine the location to display the alignment image using the display resolution, and may display the alignment image at the location.

The smart device may determine the alignment image by retrieving the alignment image from a memory. For example, the smart device may retrieve the alignment image from a memory associated with the smart device and may adjust the alignment image in accordance with the model associated with the device. The smart device may determine the alignment image by generating the alignment image. For example, smart device may generate the alignment image using one or more vectors. The smart device may determine the alignment image by retreating alignment image from a server.

At 606, the smart device may display the alignment image on a display of the smart device. For example, the smart device may generate the alignment image at the location of the display. As another example, the smart device may cause the alignment image to be rendered at the location on the display. As another example, the smart device may retrieve the alignment image from a collection of images and may display the alignment image at the location on the display. As another example, the smart device may determine a dimension of the alignment image and may display the alignment image using the dimension.

Figure 7:
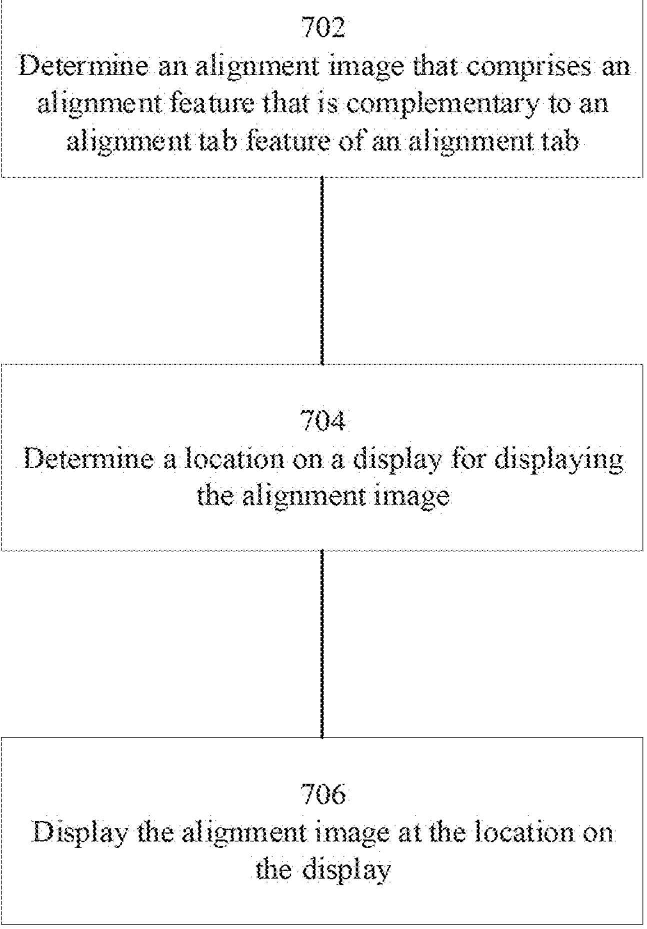
FIG. 7 depicts another example flow used by a smart device for providing an alignment image to assist a user in aligning an otoscope with a camera.

FIG. 7 depicts another example flow used by a smart device for providing an alignment image to assist a user in aligning an otoscope with a camera. The otoscope may belong to an otoscope clip device. The otoscope and/or the otoscope clip device may be referred to as a removable optical element.

At 702, the smart device may determine an alignment image that comprises an alignment feature that may be complementary to an alignment tab feature. An alignment tab may comprise the alignment tab feature. The alignment tab may belong to an otoscope clip device, which may be referred to as a removable optical element.

At 704, the smart device may determine a location on a display for displaying the alignment image. For example, the smart device may use the model identification, a parameter, and/or a dimension with a database and/or a table to determine where the alignment image may be displayed on the display. The smart device may have a database and/or table that includes a location on the display for displaying the alignment image according to the model identification. The database and/or table may be located locally on the smart device, may be located on a remote database, or a combination of both. The smart device may look up the location on the display in the database and/or table using the model identification; a parameter associated with the device, such as a display resolution; and/or a dimension of the device, such as a pixel density of a display. The smart device may use the location on the display to display the alignment image.

As another example, the smart device may use the model identification to determine one or more dimensions and/or one or more parameters that may be used to determine a location on the display. The one or more dimensions may be related to the display and/or camera. The one or more parameters may be related to the display and/or camera. The smart device may use the model identification to determine a location of a camera that belongs to the smart device, and may use the location of the camera to determine the location on the display. The smart device may determine one or more dimensions that relate to the location of the camera, such as a distance from an edge of the smart phone, and may use the one or more dimensions to determine the location on the display. The smart device may determine one or more parameters to that relate to the camera, display, and/or device, such as a display resolution and/or pixel density, and may use the one or more parameters to determine the location on the display. The smart device may determine a difference between the location of the camera and the display and may use that difference to determine the location on the display.

As another example, the smart device may use the model identification to determine one or more coordinates that indicate a center of a camera to determine the location on the display. The one or more coordinates may be determined using a database, a file, a data storage, and the like. The one or more coordinates may be calculated by determining a physical size of the smart device. The one or more coordinates may be calculated using a known coordinate for another component of the smart device.

As another example, the smart device may use a display resolution and/or a density of a display to determine the location for displaying the alignment image. For example, the smart device may determine its display resolution, may determine the location to display the alignment image using the display resolution, and may display the alignment image at the location.

At 706, the smart device may display the alignment image at the location on the display. For example, the smart device may generate the alignment image at the location of the display. As another example, the smart device may cause the alignment image to be rendered at location on the display. As another example, the smart device may retrieve the alignment image from a collection of images and may display the alignment image at the location on the display. As another example, the smart image may determine the dimensions of the alignment image and may display the image using the dimensions of the alignment image.

A device for aligning a removable optical element may be provided. The device may be a smart device, such as a smart phone or smart tablet. The device may comprise one or more of a memory, a processor, a camera, and a display. The removable optical element may be an otoscope and/or an otoscope clip device as described herein. A model identification may be determined that may indicate a model associated with the device. For example, the model may indicate that the device is an Apple iPhone 6. An alignment image may be determined using the model identification. The alignment image may indicate where an alignment tab of a removable optical element may be placed to align the removable optical element with the camera of the device. For example, the alignment image may allow the removable optical element to be aligned with the camera when an alignment tab that belongs to the removable optical element is placed on, near, or within the alignment image. The alignment image may be displayed on the display of the device. For example, the alignment image may be displayed at the location on the display. A video from the camera may be displayed on the display.

In an example, the camera may face away from the display of the device. The alignment image may be displayed on the display of the device such that the removable optical element may be aligned with the camera that faces away from the display when the alignment tab is placed within, near, or over the alignment image.

The alignment image may comprise one or more alignment image features. For example, the alignment image may comprise an alignment image feature that may be complementary to an alignment tab feature of the removable optical element. The alignment image may be used to align the removable optical element with the camera along one or more of a horizontal axis and a vertical axis.

The alignment images may comprise a first alignment image feature and a second alignment image feature. The first alignment image feature may be complementary to a first alignment tab feature. The second alignment image feature that may be complementary to a second alignment tab feature of the removable optical element. The first alignment image feature may be a vertical alignment image feature, the first alignment tab feature may be a vertical alignment tab feature, the second alignment image feature may be a horizontal alignment image feature, and the second alignment tab feature may be a horizonal alignment tab feature.

An alignment image feature may be an edge of the alignment image. An alignment tab feature may be an edge of the alignment tab. The edge of the alignment image may be complementary to the edge of the alignment tab.

An alignment image may be determined using the model identification. A location of the camera on the device may be determined using the model identification. A location on the display may be determined to display the alignment image using the location of the camera. The alignment image may be generated using the location on the display. The alignment image may be displayed on the display by displaying the alignment image at the location on the display.

In an example, an alignment image may be determined. A location of the camera on the device may be determined using the model identification. A location on the display to display the alignment image may be determined using the location of the camera. The alignment image may be generated using a difference between a location of the camera and the location on the display.

In an example, an alignment image may be determined. One or more coordinates may be determined that may indicate a center of the camera on the device using the model identification. A location on the display to display the alignment image may be determined using the one or more coordinates that indicate the center of the camera.

In an example, an alignment image may be determined. One or more dimensions of the device may be determined using the model identification. A location on the display to display the alignment image may be determined using the one or more dimensions of the device A device for aligning a removeable optical element with a camera may be provided. The device may be a smart device, such as a smart phone or smart tablet. The removable optical element may be an otoscope and/or an otoscope clip device. The device may comprise one or more of a memory, a processor, a camera, and a display. An alignment image may be determined. The alignment image may comprise an alignment feature that may be complementary to an alignment tab feature of an alignment tab that may belong to the removable optical element. A location on a display may be determined for displaying the alignment image such that the removable optical element may be aligned with the camera when the alignment tab of the removable optical element is placed on, near, or within the alignment image. The alignment image may be displayed at the location on the display.

An alignment image may comprise one or more alignment image features. An alignment image feature may be used to align the removable optical element with the camera along one or more of a horizonal axis and a vertical axis.

An alignment image may comprise a first alignment image feature and a second alignment image feature. The alignment tab may comprise a first alignment tab feature and a second alignment tab feature. The first alignment image feature may be complementary to the first alignment tab feature. The second alignment image feature may be complementary to the second alignment tab feature. The first image alignment feature may be a vertical alignment image feature. The first alignment tab feature may be a vertical alignment tab feature. The second alignment image feature may be a horizontal alignment image feature. The second alignment tab feature may be a horizontal alignment tab feature.

An alignment image feature may be an edge of the alignment image. An alignment tab feature may be an edge of the alignment tab. The edge of the alignment image may be complementary to the edge of the alignment tab.

A model identification that may indicate a model associated with the device may be determined. A location of a camera on the device may be determined. A location on the display for displaying the alignment image may be determined by determining the location on the display for displaying the alignment image using the location of the camera on the device.

The location on the display for displaying the alignment image may be determined in a number of ways. For example, one or more coordinates that indicate a center of the camera on the device may be determined using a model identification. The location on the display to display the alignment image may be determined using the one or more coordinates that may indicate the center of the camera. As another example, one or more dimensions of the device may be determined. A location of the camera may be determined using the one or more dimensions of the device. A location on the display to display the alignment image may be determined using the location of the camera.

A method may for aligning a removable optical element with a camera on a device, such as a smart device, may be provided. The removable optical element may be an otoscope and/or an otoscope clip. An alignment tab of a removable optical element may be placed on a display of the device. An alignment tab feature of the alignment tab may be aligned with an alignment image feature of an alignment image displayed on the display. Aligning the alignment tab feature with the alignment image feature may align the removable optical element with a camera of the device. The removable optical element may be secured to the device. For example, the removable optical element may be clamped to the device using a clamp of the removable optical element. A video and/or image of a view through a removable optical device may be viewed on the display.

The alignment image feature may be complementary to the alignment tab feature. The alignment image feature may be used to align the removable optical element with a camera along one or more of a horizontal axis and a vertical axis.

The alignment image may comprise one or more alignment image features. For example, the alignment image may comprise a first alignment image feature and a second alignment image feature. The alignment tab may comprise one or more alignment tab features. For example, the alignment tab may comprise a first alignment feature and a second alignment feature. The first alignment tab feature may be aligned with the first alignment image feature. The second alignment tab feature may be aligned with the second alignment image feature of the alignment image displayed on the display. The first alignment image feature may be used to align the removable optical element with a camera along a horizontal axis. The second alignment image feature may be used to align the removable optical element with the camera along a vertical axis.

A method, device, and/or a system may be provided for aligning a removeable optical. A model identification may be determined. The model identification may indicate a model associated with the device. An alignment image may be determined using the model identification. The alignment image may indicate where a portion of the removeable optical element may be placed to align the removable optical element with a camera of the device. The alignment image may be displayed on a display of the device.

In an example, the alignment image using the model identification. For example, a pixel density for the display of the device may be determined using the model identification. The alignment image may be determined using the pixel density.

In an example, the alignment image may be determined using the model identification by determining a location on the display to display the alignment image using the model identification.

In an example, the alignment image may be determined by determining one or more parameters associated with the device using the model identification. A location on the display to display the alignment image may be determined using the one or more parameters of the device.

In an example, the alignment image may be used to align the removable optical element with the camera along one or more of a horizontal axis and a vertical axis.

In an example, the alignment image may comprise an alignment image feature that may be complementary to at least a portion of the removable optical element.

In an example, the alignment image may comprise a first alignment image feature that may be complementary to at least a first portion of the removable optical element. The alignment image may comprise a second alignment image feature that may be complementary to at least a second portion of the removable optical element.

In an example, the removeable optical element may comprise a horizontal alignment feature and a vertical alignment feature. The alignment image may comprise a vertical alignment image that may be complementary to at least a portion of the vertical alignment feature. The alignment image may comprise a horizontal alignment image that may be complementary to at least a portion of the horizontal alignment feature.

In an example, the removable optical element may comprise an alignment tab. The alignment image may comprise an alignment image feature that may be complementary to at least a portion of the alignment tab.

In an example, the removable optical element may comprise an alignment tab. The camera may face away from the display. The alignment image on the display of the device may be displayed such that the removable optical element may be aligned with the camera when the alignment tab may be placed on, near, or over the alignment image.

A method, device, and/or system may be provided for aligning a removable optical element. One or more device parameters associated with the device may be determined.

A location on a display for displaying an alignment image may be determined such that the removable optical element may be aligned with the camera when a portion of the removable optical element is placed within the alignment image. The location may be determined using the one or more device parameters. The alignment image may be displayed at the location on the display.

In an example, the alignment image may comprise an alignment image feature that may be complementary to at least the portion of the removable optical element.

In an example, the one or more device parameters may comprise at least one of a model identification, a display size, a pixel density, or a number of pixels per square inch.

In an example, the one or more device parameters may be used to determine the location on the display by determining one or more coordinates that indicate a center of the camera on the device. The location on the display to display the alignment image may be determined using the one or more coordinates that indicate the center of the camera.

In an example, the alignment image may be used to align the removable optical element with the camera along one or more of a horizonal axis and a vertical axis.

This application may refer to "determining" various pieces of information. Determining the information can include one or more of, for example, estimating the information, calculating the information, predicting the information, or retrieving the information from memory.

Additionally, this application may refer to "receiving" various pieces of information. Receiving is, as with "accessing," intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/," "and/or," and "at least one of," for example, in the cases of "A/B," "A and/or B" and "at least one of A and B," is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as is clear to one of ordinary skill in this and related arts, for as many items as are listed.

We describe a number of examples. Features of these examples can be provided alone or in any combination, across various claim categories and types. Further, embodiments can include one or more of the following features, devices, or aspects, alone or in any combination, across various claim categories and types.

The invention claimed is:

1. A device for aligning a removable optical element, the device comprising:

a processor, the processor configured to:

determine a model identification, wherein the model identification indicates a model associated with the device;

determine a pixel density for a display of the device using the model identification;

determine an alignment image using the model identification and the pixel density, wherein the alignment image comprises a vertical alignment image and a horizontal alignment image that form an intersection, and wherein the alignment image indicates where the removable optical element is to be placed relative to a camera of the device by aligning an alignment tab of the removable optical element with the intersection; and display the alignment image on the display of the device.

2. The device of claim 1, wherein the processor is further configured to determine a location on the display to display the alignment image using the model identification.

3. The device of claim 1, wherein the processor is further configured to:

determine one or more parameters associated with the device using the model identification; and determine a location on the display to display the alignment image using the one or more parameters of the device.

4. The device of claim 1, wherein the alignment image can be used to align the removable optical element with the camera along one or more of a horizontal axis and a vertical axis.

5. The device of claim 1, wherein the alignment image further comprises an alignment image feature that is complementary to at least a portion of the removable optical element.

6. The device of claim 1, wherein the alignment image comprises a first alignment image feature that is complementary to at least a first portion of the alignment tab, and wherein the alignment image comprises a second alignment image feature that is complementary to at least a second portion of the alignment tab.

7. The device of claim 1, wherein the alignment tab comprises a horizontal alignment feature and a vertical alignment feature, wherein the vertical alignment image is complementary to at least a portion of the vertical alignment feature, and wherein the horizontal alignment image is complementary to at least a portion of the horizontal alignment feature.

8. The device of claim 1, wherein the camera faces away from the display, and wherein the processor is further configured to display the alignment image on the display of the device such that the removable optical element can be aligned with the camera when the alignment tab is placed over the alignment image.

9. A method performed by a device for aligning a removable optical element, the method comprising:

determining a model identification, wherein the model identification indicates a model associated with the device;

determining a pixel density for a display of the device using the model identification;

determining an alignment image using the model identification and the pixel density, wherein the alignment image comprises a vertical alignment image and a horizontal alignment image that form an intersection, and wherein the alignment image indicates where the removable optical element is to be placed relative to a camera of the device by aligning an alignment tab of the removable optical element with the intersection; and displaying the alignment image on the display of the device.

10. The method of claim 9, wherein the method further comprises determining a location on the display to display the alignment image using the model identification.

11. The method of claim 9, wherein the method further comprises:

determining one or more parameters associated with the device using the model identification; and determining a location on the display to display the alignment image using the one or more parameters of the device.

12. The method of claim 9, wherein the alignment image can be used to align the removable optical element with the camera along one or more of a horizontal axis and a vertical axis.

13. A device for aligning a removable optical element, the device comprising:

a camera;

a display; and a processor, the processor configured to:

determine one or more device parameters associated with the device, wherein the one or more device parameters comprise at least a pixel density for the display;

determine, using the one or more device parameters, a location on the display for displaying an alignment image, wherein the alignment image comprises a vertical alignment image and a horizontal alignment image that form an intersection, and wherein the alignment image indicates where the removable optical element is to be placed relative to the camera by aligning an alignment tab of the removable optical element with the intersection; and display the alignment image at the location on the display.

14. The device of claim 13, wherein the alignment image further comprises an alignment image feature that is complementary to at least a portion of the removable optical element.

15. The device of claim 13, wherein the one or more device parameters further comprises at least one of a model identification, a display size, or a number of pixels per square inch.

16. The device of claim 13, wherein the processor is further configured to:

determine one or more coordinates that indicate a center of the camera on the device using the one or more device parameters; and determine the location on the display to display the alignment image using the one or more coordinates that indicate the center of the camera.

17. The device of claim 13, wherein the alignment image can be used to align the removable optical element with the camera along at least one of a horizontal axis or a vertical axis.

* * * * *